US012726388B2

(12) United States Patent
Wu et al.

(10) Patent No.: US 12,726,388 B2
(45) Date of Patent: Sep. 1, 2026

(54) COMMUNICATION METHOD AND APPARATUS

(71) Applicant: HUAWEI TECHNOLOGIES CO., LTD., Shenzhen (CN)

(72) Inventors: Yiqun Wu, Shanghai (CN); Hongzhe Shi, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 18/425,582

(22) Filed: Jan. 29, 2024

(65) Prior Publication Data

US 2024/0171429 A1 May 23, 2024

Related U.S. Application Data

(63) Continuation of application No. PCT/CN2022/109142, filed on Jul. 29, 2022.

(30) Foreign Application Priority Data

Jul. 30, 2021 (CN) ........................ 202110872557.4

(51) Int. Cl.
*H04L 25/03* (2006.01)
*H04B 7/06* (2006.01)

(52) U.S. Cl.
CPC ..... *H04L 25/03184* (2013.01); *H04B 7/0626* (2013.01)

(58) Field of Classification Search
CPC ............. H04L 25/03184; H04L 1/0041; H04L 1/0026; H04L 1/20; H04B 7/0626
See application file for complete search history.

(56) References Cited

U.S. PATENT DOCUMENTS

2021/0110261 A1* 4/2021 Lee ........................ H04L 5/0055
2022/0060235 A1* 2/2022 Namgoong ............ G06N 3/088
2024/0202542 A1* 6/2024 Lindbom ............... G06N 3/088
2025/0047525 A1* 2/2025 Chen ................... H04L 25/0254
2025/0141514 A1* 5/2025 Li ........................ H04B 7/0658
2025/0226870 A1* 7/2025 Ren ..................... H04L 25/0228
2025/0337469 A1* 10/2025 Saber ................... H04B 7/0632
2025/0350501 A1* 11/2025 Pratik ................. H04L 25/0224

OTHER PUBLICATIONS

European Search Report issued in corresponding European Application No. 22848700.5, dated Oct. 10, 2024, pp. 1-12.

* cited by examiner

*Primary Examiner* — Abdullahi Ahmed
(74) *Attorney, Agent, or Firm* — HAUPTMAN HAM, LLP

(57) ABSTRACT

A communication method includes determining a first decoder and a first bit sequence based on N decoders, and sending first information useable to indicate the first bit sequence. An input of the first decoder includes the first bit sequence. An output of the first decoder includes first channel information, where N is a positive integer.

13 Claims, 8 Drawing Sheets

COMMUNICATION METHOD AND APPARATUS

CROSS-REFERENCE TO RELATED APPLICATIONS

This application is a continuation of International Application No. PCT/CN2022/109142, filed on Jul. 29, 2022, which claims priority to Chinese Patent Application No. 202110872557.4, filed on Jul. 30, 2021, the disclosures of the aforementioned applications are hereby incorporated by reference in their entireties.

TECHNICAL FIELD

The present disclosure relates to the field of communication technologies, and in particular, to a communication method and apparatus.

BACKGROUND

In a mobile communication system that uses frequency division duplex (frequency division duplex, FDD) or time division duplex (time division duplex, TDD), a terminal device may send channel state information (channel state information, CSI) to an access network device, to feed back channel information. The access network device may determine transmission parameters such as precoding information and/or a modulation scheme based on the CSI sent by the terminal device. The transmission parameters may be used by the access network device to send data to the terminal device.

Currently, channel information loss is usually relatively significant when the terminal device generates the CSI, which affects channel information feedback precision.

SUMMARY

One or more embodiments of the present disclosure provide a communication method and apparatus, to improve channel information feedback precision.

According to a first aspect, the present disclosure provides a communication method, including: determining a first decoder and a first bit sequence based on N decoders, where an input of the first decoder includes the first bit sequence, an output of the first decoder includes first channel information, and N is a positive integer; and sending information that indicates the first bit sequence.

In some embodiments, a decoder is used to derive a bit sequence for channel information feedback. This can improve channel information feedback precision. Based on this design, a terminal device side may derive, through the decoder, a bit sequence corresponding to channel information, so that a network side such as an access network device can obtain a reconstructed channel based on the bit sequence. In this design, a channel reconstructed by the access network device based on a bit sequence can be approximate to an actually measured channel to a greatest extent, and an error between the reconstructed channel and the actually measured channel is reduced. Therefore, an information loss can be reduced, and channel information feedback precision can be improved.

In some embodiments, a difference between the first channel information and second channel information is less than a first threshold, and the second channel information is channel information obtained through measurement on a terminal device side. In this design, a channel reconstructed by the access network device based on the first bit sequence can be approximate to the actually measured channel to a greatest extent, and an error between the reconstructed channel and the actually measured channel is reduced.

In some embodiments, the determining a first decoder and a first bit sequence based on N decoders includes: determining the first bit sequence based on the first decoder, where N equals 1, and the one decoder is the first decoder.

In some embodiments, N is greater than 1, and the first decoder may be one of the N decoders.

In some embodiments, the output of the first decoder in the N decoders is most approximate to the second channel information, the second channel information is the channel information obtained through measurement on the terminal device side, and N is greater than 1. In this design, an optimal decoder is determined from a plurality of decoders. This can further improve channel reconstruction precision.

In some embodiments, the communication method further includes: determining an $(i+1)^{th}$ to-be-optimized bit sequence based on an $i^{th}$ to-be-optimized bit sequence, where i ranges from 1 to M−1, M is a positive integer greater than or equal to 2, and an $M^{th}$ to-be-optimized bit sequence is the first bit sequence.

In some embodiments, the communication method further includes: determining an $(i+1)^{th}$ to-be-optimized bit sequence based on an $i^{th}$ to-be-optimized bit sequence and a gradient descent algorithm, where i ranges from 1 to M−1, M is a positive integer greater than or equal to 2, and an $M^{th}$ to-be-optimized bit sequence is the first bit sequence. In this design, the first bit sequence can be quickly determined. This improves communication efficiency.

In some embodiments, M is a preset value.

In some embodiments, an objective function of the gradient descent algorithm is used to indicate a difference between $i^{th}$ channel information and the second channel information, the second channel information is the channel information obtained through measurement on the terminal device side, the input of the first decoder includes the $i^{th}$ to-be-optimized bit sequence, and the output of the first decoder includes the $i^{th}$ channel information. In this design, communication efficiency can be improved. In addition, the channel reconstructed by the access network device based on the first bit sequence can be approximate to the actually measured channel to a greatest extent.

In some embodiments, the communication method further includes: encoding the second channel information based on an encoder corresponding to the first decoder, to determine a first to-be-optimized bit sequence, where the encoder is configured to encode channel information to obtain a bit sequence. In this design, assistance is provided by using the encoder, and a bit sequence to be fed back can be more quickly derived from a perspective of the decoder. This reduces computational complexity.

In some embodiments, the first to-be-optimized bit sequence is randomly determined.

In some embodiments, the communication method further includes: sending information that indicates the first decoder. In this design, the network side such as the access network device can use the first decoder for decoding, and the decoder is the same as that used on the terminal device side. This facilitates subsequent data transmission.

According to a second aspect, the present disclosure provides a communication method, including: obtaining information that indicates a first bit sequence; and obtaining first channel information based on a first decoder and the first bit sequence, where an input of the first decoder includes the first bit sequence, and an output of the first decoder includes the first channel information.

In some embodiments, a difference between the first channel information and second channel information is less than a first threshold, and the second channel information is channel information obtained through measurement on a terminal device side. In some embodiments, the communication method further includes: obtaining information that indicates the first decoder. In some embodiments, the communication method further includes: sending information that indicates N decoders, where the N decoders include the first decoder, and N is a positive integer.

According to a third aspect, the present disclosure provides a communication apparatus, configured to implement the method according to the first aspect. The communication apparatus may be a terminal device, may be an apparatus in a terminal device, or may be an apparatus that can be used in cooperation with a terminal device. In a design, the communication apparatus may include a module in a one-to-one correspondence with the method/operation/step/action described in the first aspect. The module may be a hardware circuit or software, or may be implemented by using a combination of a hardware circuit and software. In a design, the communication apparatus may include a processing module and a communication module.

For example, the communication apparatus includes: the processing module, configured to determine a first decoder and a first bit sequence based on N decoders, where an input of the first decoder includes the first bit sequence, an output of the first decoder includes first channel information, and N is a positive integer; and the communication module, configured to send information that indicates the first bit sequence.

For related descriptions of the N decoders, the first decoder, the first bit sequence, and the like, refer to the first aspect. Details are not described herein.

In some embodiments, the communication module is further configured to send information that indicates the first decoder.

According to a fourth aspect, the present disclosure provides a communication apparatus, configured to implement the method according to the second aspect. The communication apparatus may be an access network device, an apparatus in an access network device, or an apparatus that can be used in cooperation with an access network device. In a design, the communication apparatus may include a module in a one-to-one correspondence with the method/operation/step/action described in the second aspect. The module may be a hardware circuit or software, or may be implemented by using a combination of a hardware circuit and software. In a design, the communication apparatus may include a processing module and a communication module.

For example, the communication apparatus includes: the communication module, configured to obtain information that indicates a first bit sequence; and the processing module, configured to obtain first channel information based on a first decoder and the first bit sequence, where an input of the first decoder includes the first bit sequence, and an output of the first decoder includes the first channel information.

In some embodiments, a difference between the first channel information and second channel information is less than a first threshold, and the second channel information is channel information obtained through measurement on a terminal device side.

In some embodiments, the communication module is further configured to obtain information that indicates the first decoder.

In some embodiments, the communication module is further configured to send information that indicates N decoders, where the N decoders include the first decoder, and N is a positive integer.

According to a fifth aspect, the present disclosure provides a communication apparatus. The communication apparatus includes a processor, configured to implement the method described in the first aspect. The communication apparatus may further include a memory, configured to store instructions and data. The memory is coupled to the processor, and when executing the instructions stored in the memory, the processor can implement the method described in the first aspect. The communication apparatus may further include a communication interface. The communication interface is used by the apparatus to communicate with another device. For example, the communication interface may be a transceiver, a circuit, a bus, a module, or a communication interface of another type. The another device may be an access network device. In some embodiments, the communication apparatus includes:

- the memory, configured to store program instructions; and
- the processor, configured to determine a first decoder and a first bit sequence based on N decoders, where an input of the first decoder includes the first bit sequence, an output of the first decoder includes first channel information, and N is a positive integer; and send, through the communication interface, information that indicates the first bit sequence.

According to a sixth aspect, the present disclosure provides a communication apparatus. The communication apparatus includes a processor, configured to implement the method described in the second aspect. The communication apparatus may further include a memory, configured to store instructions and data. The memory is coupled to the processor, and when executing the instructions stored in the memory, the processor can implement the method described in the second aspect. The apparatus may further include a communication interface. The communication interface is used by the apparatus to communicate with another device. For example, the communication interface may be a transceiver, a circuit, a bus, a module, or a communication interface of another type. The another device may be a terminal device. In a possible device, the apparatus includes:

- the memory, configured to store program instructions; and
- the processor, configured to: obtain, through the communication interface, information that indicates a first bit sequence, and obtain first channel information based on a first decoder and the first bit sequence, where an input of the first decoder includes the first bit sequence, and an output of the first decoder includes the first channel information.

According to a seventh aspect, the present disclosure provides a communication system, including the communication apparatus described in the third aspect and any one of the possible designs of the third aspect, and the communication apparatus described in the fourth aspect and any one of the possible designs of the fourth aspect.

According to an eighth aspect, the present disclosure further provides a computer program. When the computer program is run on a computer, the computer is enabled to perform the method according to the first aspect or the second aspect.

According to a ninth aspect, the present disclosure further provides a computer program product, including instructions. When the instructions are run on a computer, the computer is enabled to perform the method according to the first aspect or the second aspect.

According to a tenth aspect, the present disclosure further provides a computer-readable storage medium, where the computer-readable storage medium stores a computer program or instructions. When the computer program is run or the instructions are run on a computer, the computer is enabled to perform the method according to the first aspect or the second aspect.

According to an eleventh aspect, the present disclosure further provides a chip. The chip is configured to read a computer program stored in a memory, to perform the method according to the first aspect or the second aspect.

According to a twelfth aspect, the present disclosure further provides a chip system. The chip system includes a processor, configured to support a computer apparatus in implementing the method according to the first aspect or the second aspect. In some embodiments, the chip system further includes a memory. The memory is configured to store a program and data that are necessary for the computer apparatus. The chip system may include a chip, or may include a chip and another discrete device.

DETAILED DESCRIPTION

The present disclosure is described in detail below with reference to accompanying drawings.

The following first explains and describes some terms used in the present disclosure.

(1) Encoder and Decoder

The encoder in the present disclosure is configured to perform encoding or compression. The decoder in the present disclosure is configured to perform decoding or recovery. In the methods of the present disclosure, the encoder and the decoder may be used in cooperation with each other. Alternatively, the decoder may be used, but the encoder is not used. This is not limited.

Figure 1:
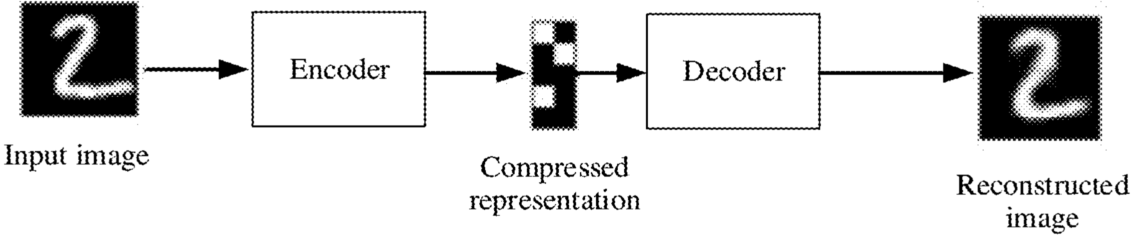
FIG. 1 is a schematic diagram of a structure of an auto-encoder.

For example, the encoder (encoder) and the decoder (decoder) may be two parts included in an auto-encoder (auto-encoder, AE). The auto-encoder is a neural network of unsupervised learning. A feature of the auto-encoder is that the auto-encoder uses input data as labeled data. Therefore, the auto-encoder may also be considered as a neural network of self-supervised learning. The auto-encoder can be used to compress and recover data. FIG. 1 shows a network model of the auto-encoder. An original image of “2” is input into the encoder of the auto-encoder, and the encoder outputs a compressed representation (compressed representation) corresponding to the original image. The compressed representation is used as an input of the decoder, and an output of the decoder includes a reconstructed (reconstructed) image of “2”. Compared with the original image of “2”, the reconstructed image of “2” may be slightly distorted. Performance of the auto-encoder can be evaluated based on a reconstruction error of the image of “2”. A smaller error indicates better performance of the auto-encoder. It may be understood that the foregoing compressed representation may also be referred to as a low-dimensional representation.

The encoder and/or decoder of the auto-encoder may be implemented by using a neural network or another machine learning model. The neural network may be a deep neural network (deep neural network, DNN). For example, the encoder and/or the decoder of the auto-encoder may be implemented by using a multilayer perceptron (multilayer perceptron, MLP), a convolutional neural network (convolutional neural network, CNN), a recurrent neural network (recurrent neural network, RNN), or another type of deep neural network. This is not limited in the present disclosure. Network forms of the encoder and the decoder may be the same or may be different. This is not limited. It is assumed that the encoder and the decoder are implemented in a same network form. For example, the encoder and the decoder each are implemented by using the MLP, the CNN, or the RNN. In this case, network parameters of the encoder and the decoder may be the same or may be different. This is not limited.

(2) Deep Neural Network (Deep Neural Network, DNN)

The DNN is a specific implementation form of machine learning (machine learning, ML). According to a universal approximation theorem, a neural network can approximate any continuous function in theory. Therefore, the neural network is capable of learning any mapping. In a communication system of some approaches, a design of a communication module needs to rely on rich expert knowledge. However, a DNN-based deep learning communication system can automatically discover an implicit pattern structure based on a large quantity of datasets, establish a mapping relationship between data, and obtain performance better than that of a modeling method of some approaches.

An idea of the DNN is inspired by a neuron structure of brain tissue. Each neuron performs a weighted summation on an input value of the neuron, and outputs a weighted summation result through an activation function. It is assumed that an input of the neuron is $x=[x_0, x_1, \ldots x_n]$, a weight value or a weight corresponding to the input is $w=[w_0, w_1, \ldots w_n]$, and a bias for a weighted summation is b. The activation function may have diversified forms, and this is not limited. For example, if an activation function of a neuron is y=f(z)=max{0, z}, an execution output of the neuron is $$y=f\left(\sum_{i=0}^{n} w_i * x_i + b\right) = \max\left\{0, \sum_{i=0}^{n} w_i * x_i + b\right\}.$$

$w_i * x_i$ represents a product of $w_i$ and $x_i$, and a data type of b is an integer or a floating point number. Optionally, a value of b is 0, and a data type of $w_i$ is an integer or a floating point number.

Based on different network structures and application scenarios, DNNs can be classified into multilayer perceptrons (MLPs), convolutional neural networks (CNNs), and recurrent neural networks (RNNs). The following describes in detail the multilayer perceptron MLP, the convolutional neural network CNN, and the recurrent neural network RNN with reference to FIG. 2 to FIG. 4.

Figure 2:
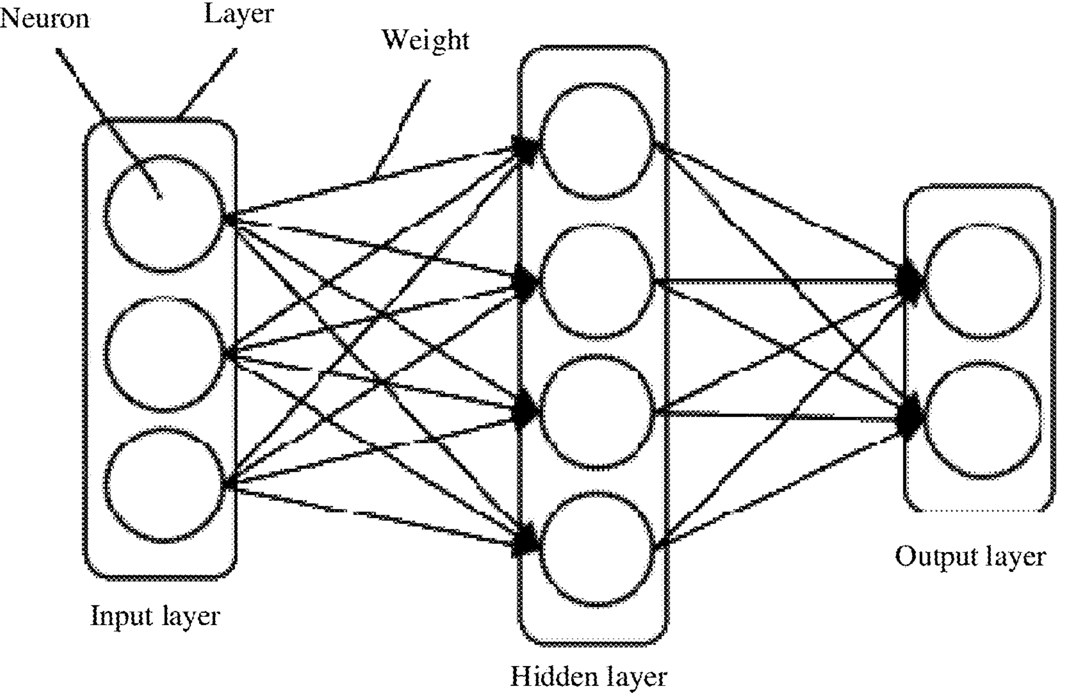
FIG. 2 is a schematic diagram of a network structure of a multilayer perceptron.

FIG. 2 shows a network structure of the multilayer perceptron MLP. From perspectives of an input to an output, the MLP sequentially includes one input layer, one or more hidden layers, and one output layer. Each layer of the MLP may include one or more neurons. The input layer of the MLP performs neuron processing on a received value, and then transfers a processed value to an intermediate hidden layer. Similarly, the hidden layer transfers a computation result to an adjacent next hidden layer or the adjacent output layer, to generate a final output of the MLP. A typical feature of the MLP is that all neurons in two adjacent layers are fully connected. An expression capability of the network can be improved by increasing a quantity of hidden layers or expanding a width of each layer. A width of a layer refers to a quantity of neurons included in the layer. The MLP is a fully connected structure and has a large quantity of parameters. Therefore, large storage space and a high computing capability are needed. The MLP is suitable for scenarios in which a large amount of data needs to be processed.

Figure 3:
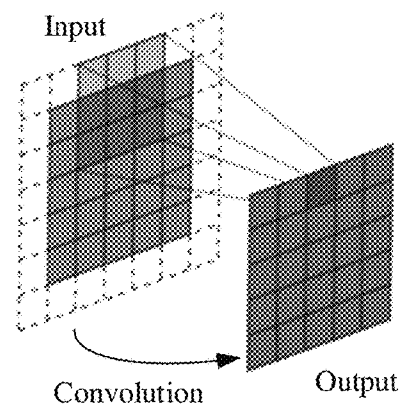
FIG. 3 is a schematic diagram of a network structure of a convolutional neural network.

FIG. 3 shows a network structure of the convolutional neural network CNN. A convolutional layer of the CNN does not perform a convolution operation by using all input information at a time. Instead, one or more windows of a fixed size are specified, and a portion of the input information is intercepted by each window, to perform the convolution operation. Such a design can greatly reduce a calculation amount of a model parameter. Specifically, performing a convolution operation for any one of the one or more windows of a fixed size may be understood as: performing a multiplication operation and then an addition operation on a coefficient (such as a weighting coefficient) of the window and a portion that is of the input information and that is intercepted by the window. After the convolution operation is performed, output information corresponding to the window may be obtained. Coefficients of different windows may be independently configured. For example, different coefficients may be configured for different windows, so that the CNN can extract a feature of input data more efficiently. A coefficient of a window may include a convolution kernel. Optionally, types of portions that are of the input information and that are intercepted by different windows may be different. For example, a person and an object in a same image may be understood as different types of information. In two specified windows of a fixed size, one window may intercept the person in the image, and the other window may intercept the object in the image. The CNN may be used to process data with a grid-like structure. The data with a grid-like structure may include time series data (time-axis discrete sampling), image data (two-dimensional discrete sampling), and the like.

Figure 4:
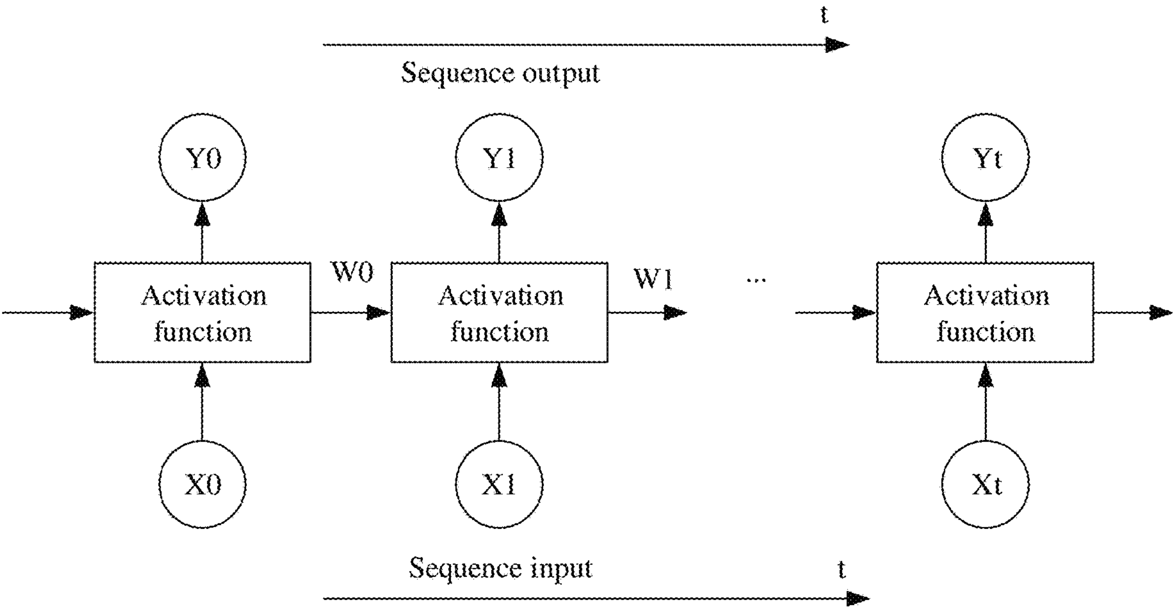
FIG. 4 is a schematic diagram of a network structure of a recurrent neural network.

FIG. 4 shows a network structure of the recurrent neural network RNN. The RNN is a DNN network that utilizes feedback time series information. An input of the RNN includes a new input value for a current moment and some of output values of the RNN for a previous moment, where the output values for the previous moment may be determined by an activation function and an input for the previous moment. For example, as shown in FIG. 4, the new input value for the current moment is X1, and the output values for the previous moment are W0 and Y0. X1 and W0 are input into the activation function, and outputs W1 and Y1 for the current moment may be obtained. By analogy, an output value for a subsequent moment may be obtained. The RNN appropriately obtains a sequence feature having a time correlation, and is suitable for application scenarios such as speech recognition and channel encoding and decoding.

(3) In the present disclosure, "a plurality of" means two or more. The term "and/or" describes an association relationship between associated objects and indicates that three relationships may exist. For example, A and/or B may indicate the following three cases: Only A exists, both A and B exist, and only B exists. A character "/" usually indicates an "or" relationship between associated objects. In addition, it should be understood that although terms such as "first" and "second" may be used in the present disclosure to describe objects, these objects should not be limited by these terms. These terms are merely used to distinguish the objects from each other.

(4) Terms "including", "having", and any other variant thereof mentioned in descriptions of the present disclosure are intended to cover a non-exclusive inclusion. For example, a process, a method, a system, a product, or a device that includes a series of steps or units is not limited to the listed steps or units, but optionally further includes another unlisted step or unit, or optionally further includes another step or unit that is inherent to the process, the method, the product, or the device. It should be noted that a term such as "example" or "for example" in the present disclosure is used to represent an example, an instance, or an illustration. Any method or design solution described as "example" or "for example" in the present disclosure should not be explained as being superior to or having more advantages than another method or design solution. Exactly, use of the term "example", "for example", or the like is intended to present a related concept in a specific manner.

In a mobile communication system such as a 5G system, application of a massive (massive) multiple-input multiple-output (multiple-input multiple-output, MIMO) technology plays a key role in improving spectral efficiency of the system. An access network device can use the massive MIMO technology to provide high-quality services for more terminal devices simultaneously. To this end, a crucial step is to precode data sent to a terminal device. A precoding technology can perform spatial multiplexing (spatial multiplexing) on data in a plurality of streams, which can minimize interference between data in different streams. The precoding technology is used to improve a signal to interference plus noise ratio (signal to interference plus noise ratio, SINR) at a receive end, and then to improve an overall throughput. A prerequisite for accurate precoding is that a base station needs to obtain accurate channel information.

Specifically, the channel information herein may be channel information of a downlink channel.

In a technology of some approaches, an uplink channel and a downlink channel are reciprocal in a TDD system. Therefore, an access network device in the TDD system may obtain channel information of the downlink channel by measuring the uplink channel. However, in an FDD system, there is a frequency difference between an uplink channel and a downlink channel, and the uplink channel and the downlink channel are merely partially reciprocal. An access network device obtains channel information of the downlink channel mainly by using a CSI feedback mechanism. In addition, in some scenarios in which a quantity of uplink transmit antennas is different from a quantity of downlink receive antennas, or an uplink SINR is low, the access network device may obtain the channel information of the downlink channel by using the CSI feedback mechanism. The CSI feedback mechanism is mainly a mechanism in which a terminal device sends channel state information (channel state information, CSI) to an access network device, where the CSI indicates channel information obtained by the terminal device by performing channel measurement on a downlink channel. The CSI may include a rank indicator (rank indicator, RI), a channel quality indicator (channel quality indicator, CQI), and/or a precoding matrix indicator (precoding matrix indicator, PMI). In the CSI feedback mechanism, channel information is usually compressed, which easily causes a large channel information loss and affects channel information feedback precision.

In view of this, the present disclosure provides a communication method, to improve channel information feedback precision and reduce an error between a reconstructed channel and an actually measured channel. In the present disclosure, a decoder is provided for a terminal device. The terminal device may determine, based on the decoder, information that needs to be fed back, such as a bit sequence that needs to be fed back. The bit sequence that needs to be fed back may also be referred to as a feedback bit or a code word. In this design, a channel reconstructed by an access network device based on the feedback information can be approximate to the actually measured channel to a greatest extent. The following describes in detail the communication method provided in the present disclosure. The present disclosure does not limit a system to which the disclosed method can be applied. For example, the method may be applied to a TDD system and/or an FDD system.

The following describes, by using an example, a communication system to which the communication method in the present disclosure may be applied.

In some embodiments, the communication method provided in the present disclosure may be applied to various communication systems. For example, the communication system may be a third generation (3rd generation, 3G) mobile communication system (such as a universal mobile telecommunications system (universal mobile telecommunications system, UMTS)), a fourth generation (4th generation, 4G) mobile communication system (such as a long term evolution (long term evolution, LTE) system), a fifth generation (5th generation, 5G) mobile communication system, a worldwide interoperability for microwave access (worldwide interoperability for microwave access, WiMAX) system, a wireless local area network (wireless local area network, WLAN) system, or a system integrating a plurality of systems. The 5G (mobile communication) system may also be referred to as a new radio (new radio, NR) system. In a communication system, an entity may send a signal (such as configuration information or data) to another entity, or receive a signal from another entity.

Figure 5:
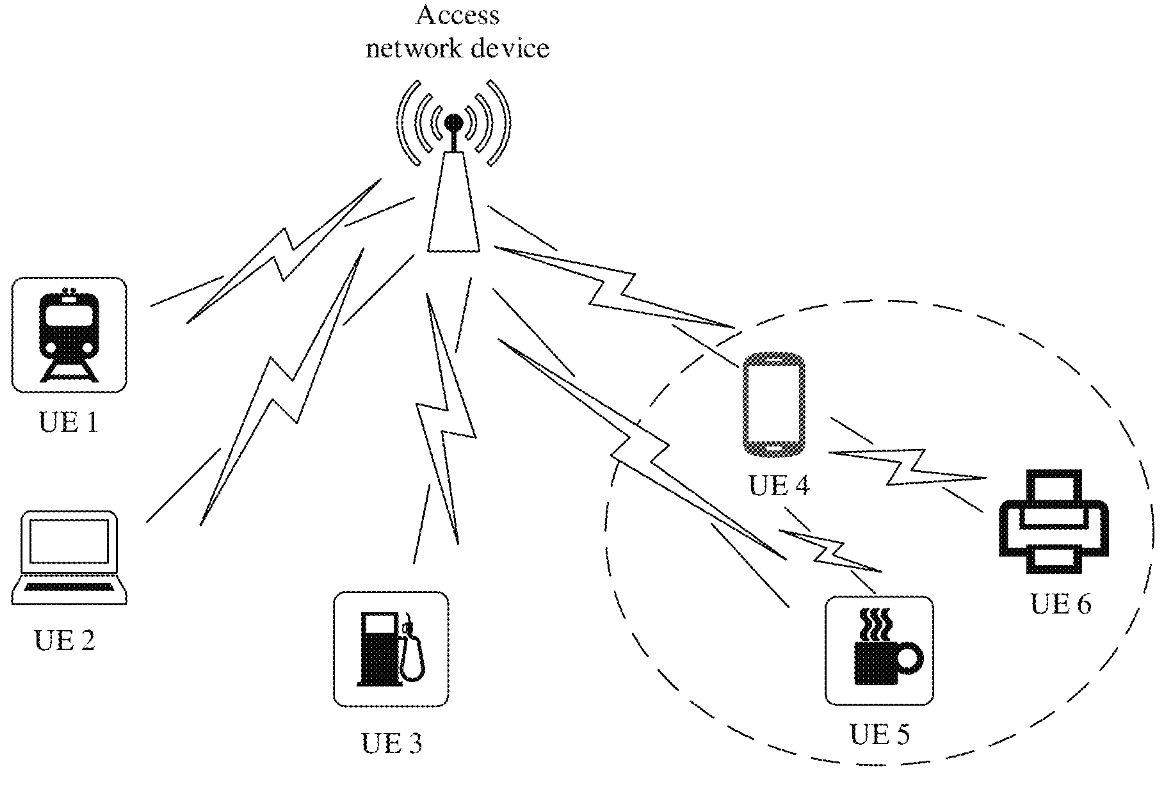
FIG. 5 is a schematic diagram of a structure of a communication system according to the present disclosure.

FIG. 5 shows a communication system. The communication system may include at least one terminal device and at least one access network device. For example, an entity that sends configuration information is the access network device, and an entity that receives the configuration information is the terminal device. A quantity of access network devices and a quantity of terminal devices in the communication system are not limited in the present disclosure.

The access network device may be a base station (base station, BS). The access network device may also be referred to as a network device or an access node (access node, AN). The access network device may provide a wireless access service for the terminal device. Specifically, the access network device may be an evolved NodeB (evolved NodeB, eNB or eNodeB) in an LTE system, a next generation NodeB (next generation NodeB, gNB) in a 5G network, a small base station device, a wireless access node (Wi-Fi AP), or the like. This is not limited in the present disclosure. In the present disclosure, a communication apparatus configured to implement a function of the access network device may be the access network device, may be a network device having some functions of the access network device, or may be an apparatus that can support the access network device in implementing the function, for example, a chip system. The apparatus may be installed in the access network device. In the method in the present disclosure, an example in which the communication apparatus configured to implement a function of the access network device is the access network device is used for description.

The terminal device is also referred to as a terminal, user equipment (user equipment, UE), a mobile station (mobile station, MS), a mobile terminal (mobile terminal, MT), or the like; and is a device that provides a user with voice and/or data connectivity. For example, the terminal device is a handheld device or a vehicle-mounted device that has a wireless connection function. Some examples of the terminal are: a wireless network camera, a mobile phone (mobile phone), a tablet, a notebook computer, a palmtop computer, a mobile internet device (mobile internet device, MID), a wearable device such as a smartwatch, a virtual reality (virtual reality, VR) device, an augmented reality (augmented reality, AR) device, a wireless terminal in industrial control (industrial control), a terminal in an internet of vehicles system, a wireless terminal in self driving (self driving), a wireless terminal in a smart grid (smart grid), a wireless terminal in transportation safety (transportation safety), a wireless terminal such as a smart fuel dispenser in a smart city (smart city), a terminal device in a high-speed train, and a wireless terminal such as a smart speaker, a smart coffee machine, or a smart printer in smart home (smart home). In the present disclosure, a communication apparatus configured to implement a function of the terminal device may be the terminal device, may be a terminal device having some functions of a terminal, or may be an apparatus that can support the terminal device in implementing the function, for example, a chip system. The apparatus may be installed in the terminal device. In the method in the present disclosure, an example in which the communication apparatus configured to implement a function of the terminal device is the terminal device is used for description.

For example, FIG. 5 shows one access network device and six terminal devices such as UE 1, UE 2, UE 3, UE 4, UE 5, and UE 6. In the communication system, the access network device may send configuration information to the UE 1 to the UE 6. At least one of the UE 1 to the UE 6 may send uplink data to the access network device, and the access network device may receive the uplink data. The access network device may send downlink data to at least one of the UE 1 to the UE 6. For example, the UE 1 shown in FIG. 5 is the terminal device on the high-speed train, the UE 2 is the notebook computer, the UE3 is the smart fuel dispenser, the UE 4 is the mobile phone, the UE 5 is the smart coffee machine, and the UE 6 is the smart printer. However, this does not mean that a type of the terminal device in the communication system in the present disclosure is limited to this example. The type of the terminal device in the communication system may be as described in the foregoing example, or may be a device of another type. The type of the terminal device in the communication system is not limited in the present disclosure. In addition, the UE 4, the UE 5, and the UE 6 may also form a communication system. In this case, both an entity that sends configuration information and an entity that receives the configuration information may be terminal devices. A plurality of terminal devices may send data to each other. For example, the UE 4 may send configuration information to the UE 5. The UE 5 receives the configuration information sent by the UE 4, and sends data to the UE 4. The UE 4 may also send data to the UE 5.

(1) Protocol Layer Structure

Communication between an access network device and a terminal device complies with a specified protocol layer structure. The protocol layer structure may include a control-plane protocol layer structure and a user-plane protocol layer structure. For example, the control-plane protocol layer structure may have functions of protocol layers such as a radio resource control (radio resource control, RRC) layer, a packet data convergence protocol (packet data convergence protocol, PDCP) layer, a radio link control (radio link control, RLC) layer, a media access control (media access control, MAC) layer, and a physical layer. For example, the user-plane protocol layer structure may have functions of protocol layers such as the PDCP layer, the RLC layer, the MAC layer, and the physical layer. In an implementation, there is further a service data adaptation protocol (service data adaptation protocol, SDAP) layer above the PDCP layer.

Data transmission between the access network device and the terminal device is used as an example. The data transmission needs to pass through user-plane protocol layers, such as the SDAP layer, the PDCP layer, the RLC layer, the MAC layer, and the physical layer. The SDAP layer, the PDCP layer, the RLC layer, the MAC layer, and the physical layer may also be collectively referred to as an access stratum. Each of the foregoing layers is further divided into a sending part and a receiving part based on a data transmission direction of sending or receiving. Downlink data transmission is used as an example. After obtaining data from an upper layer, the PDCP layer transmits the data to the RLC layer and the MAC layer. Then, the MAC layer generates a transport block, and wireless transmission is performed at the physical layer. Data is encapsulated at each layer. For example, data received by a layer from an upper layer of the layer is considered as a service data unit (service data unit, SDU) of the layer, and is encapsulated into a protocol data unit (protocol data unit, PDU) by the layer. Then, the protocol data unit is transmitted to a next layer.

For example, protocol layers of the terminal device may further include an application layer and a non-access stratum. The application layer may be configured to provide a service for an application installed on the terminal device. For example, downlink data received by the terminal device may be sequentially transmitted from the physical layer to the application layer, and then provided by the application layer for the application. For another example, the application layer may obtain data generated by an application, sequentially transmit the data to the physical layer, and send the data to another communication apparatus. The non-access stratum may be used to forward user data. For example, the non-access stratum forwards, to the SDAP layer, uplink data received from the application layer: or forwards, to the application layer, downlink data received from the SDAP layer.

(2) Central Unit (Central Unit, CU) and Distributed Unit (Distributed Unit, DU)

An access network device may include the CU and the DU. A plurality of DUs may be controlled by one CU in a centralized manner. For example, an interface between the CU and the DU may be referred to as an F1 interface. A control plane (control plane, CP) interface may be represented by F1-C, and a user plane (user plane, UP) interface may be represented by F1-U. Functions of the CU and the DU may be obtained through division based on protocol layers of a wireless network. For example, functions of the PDCP layer and a protocol layer above the PDCP layer are provided by the CU, and functions of protocol layers (such as the RLC layer and the MAC layer) below the PDCP layer are provided by the DU. For another example, a function of a protocol layer above the PDCP layer is provided by the CU, and a function of a protocol layer below the PDCP layer is provided by the DU.

It may be understood that, that processing functions of the CU and the DU are obtained through division based on protocol layers is merely an example, and division may alternatively be performed in another manner. For example, division may be performed so that the CU or the DU has more functions of the protocol layers. For another example, division may be further performed so that the CU or the DU has some of processing functions of the protocol layers. In a design, some functions of the RLC layer and a function of a protocol layer above the RLC layer are provided by the CU, and remaining functions of the RLC layer and a function of a protocol layer below the RLC layer are provided by the DU. In another design, a function of the CU or the DU may alternatively be obtained through division based on a service type or another system requirement. For example, division may be performed based on a delay. A function whose processing time needs to meet a delay requirement is provided by the DU, and a function whose processing time does not need to meet the delay requirement is provided by the CU. In another design, the CU may alternatively have one or more functions of a core network. For example, the CU may be disposed on a network side to facilitate centralized management. In another design, a radio unit (radio unit, RU) of the DU is disposed remotely. The RU has a radio frequency function.

Optionally, the DU and the RU may be further obtained through division performed at the physical layer (physical layer, PHY). For example, the DU may implement a higher-layer function of the PHY layer, and the RU may implement a lower-layer function of the PHY layer. When the PHY layer is used for sending, functions of the PHY layer may include cyclic redundancy check (cyclic redundancy check, CRC) code addition, channel encoding, rate matching, scrambling, modulation, layer mapping, precoding, resource mapping, physical antenna mapping, and/or a radio frequency sending function. When the PHY layer is used for receiving, functions of the PHY layer may include CRC, channel decoding, rate de-matching, descrambling, demodulation, layer demapping, channel detection, resource demapping, physical antenna demapping, and/or a radio frequency receiving function. Higher-layer functions of the PHY layer may include some functions of the PHY layer. For example, the some functions are closer to the MAC layer. Lower-layer functions of the PHY layer may include other functions of the PHY layer. For example, the other functions are closer to a radio frequency function. For example, the higher-layer functions of the PHY layer may include CRC code addition, channel encoding, rate matching, scrambling, modulation, and layer mapping; and the lower-layer functions of the PHY layer may include precoding, resource mapping, physical antenna mapping, and the radio frequency sending function. Alternatively, the higher-layer functions of the PHY layer may include CRC code addition, channel encoding, rate matching, scrambling, modulation, layer mapping, and precoding; and the lower-layer functions of the PHY layer may include resource mapping, physical antenna mapping, and the radio frequency sending function.

For example, functions of the CU may be implemented by one entity or different entities. For example, the functions of the CU may be further divided. To be specific, a control plane and a user plane are separated and implemented by using different entities, that is, a control-plane CU entity (namely, a CU-CP entity) and a user-plane CU entity (namely, a CU-UP entity). The CU-CP entity and the CU-UP entity may be coupled to the DU, to jointly implement a function of the access network device.

In the foregoing network architecture, signaling generated by the CU may be sent to a terminal device through the DU, or signaling generated by a terminal device may be sent to the CU through the DU. For example, RRC- or PDCP-layer signaling is finally processed into physical-layer signaling and sent to the terminal device, or is converted from received physical-layer signaling. In this architecture, the RRC- or PDCP-layer signaling may be considered as signaling sent through the DU, or signaling sent through the DU and the RU.

Optionally, any one of the DU, the CU, the CU-CP, the CU-UP, and the RU may be a software module, a hardware structure, or a combination of a software module and a hardware structure. This is not limited. Different entities may exist in different forms, and this is not limited. For example, the DU, the CU, the CU-CP, and the CU-UP are software modules, and the RU is the hardware structure. These modules and methods performed by the modules also fall within the protection scope of the present disclosure.

In another optional implementation, an independent network element (such as an artificial intelligence (artificial intelligence, AI) network element or an AI node) may be introduced in the foregoing communication systems to determine an encoder and/or a decoder. Alternatively, an AI function, an AI module, or an AI entity may be configured in an existing network element in the communication systems to determine an encoder and/or a decoder. For example, in a 5G NR system, an existing network element may be an access network device (such as a gNB), a core network device, or a network management element (operation, administration and maintenance, OAM). In the method in the present disclosure, the AI network element is used as an example for description. The AI network element may be directly connected to an access network device in a communication system, or may be indirectly connected to the access network device through a third-party network element. The third-party network element may be a core network network element such as an authentication management function (authentication management function, AMF) network element or a user plane function (user plane function, UPF) network element.

In addition, if a manner of configuring the AI function or the AI module in an existing network element is used, the AI network element in the following method may alternatively be replaced by the existing network element. For example, if the AI function or the AI module is configured in a corresponding core network device or a corresponding network management element, a method implemented by the AI network element in the following method may alternatively be implemented by the core network device or the network management element. Alternatively, if the AI function or the AI module is configured in an access network device, functions of the AI network element and the access network device in the following method may be combined, and methods implemented by both the AI network element and the access network device are implemented by the access network device. Specifically, a function of the AI network element may be implemented by an AI entity in the access network device.

Figure 6:
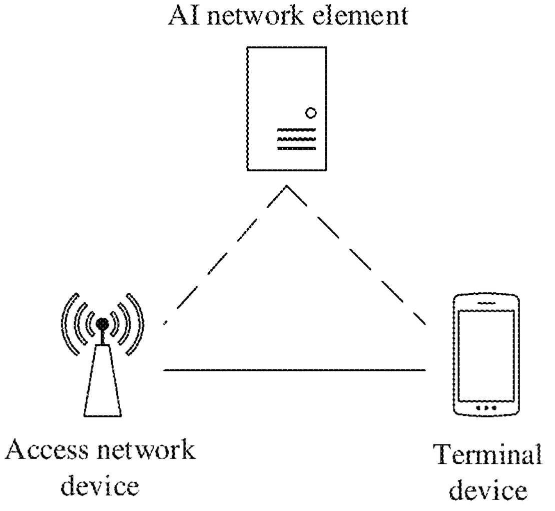
FIG. 6 is a schematic diagram of a structure of another communication system according to the present disclosure.

For example, FIG. 6 shows another communication system. The communication method provided in the present disclosure may also be applied to this communication system. The communication system includes one access network device, one terminal device, and one AI network element. When the communication system is a 5G NR system, the access network device may be a 5G base station such as a gNB, and the terminal device may alternatively be recorded as user equipment UE. In the 5G NR system, an interface between the gNB and the UE is represented by NR-Uu. In addition, it should be noted that the communication system shown in FIG. 6 may alternatively include at least one access network device, at least one terminal device, and at least one AI network element. A quantity of devices in the communication system is not limited in the present disclosure.

Specifically, a process in which the AI network element determines an encoder and/or a decoder mainly includes a data collection phase and a model training phase. The AI network element may collect data by itself or may receive data from another independent data collection network element (which is also referred to as a data collection module). The independent data collection network element may be a separately disposed network element that is dedicated to data collection and that is different from the access network device and the terminal device. The independent data collection network element is responsible for collecting data and sending the collected data to the AI network element. In the following, an example in which the AI network element collects data independently is used for description.

Figures 7, 8:
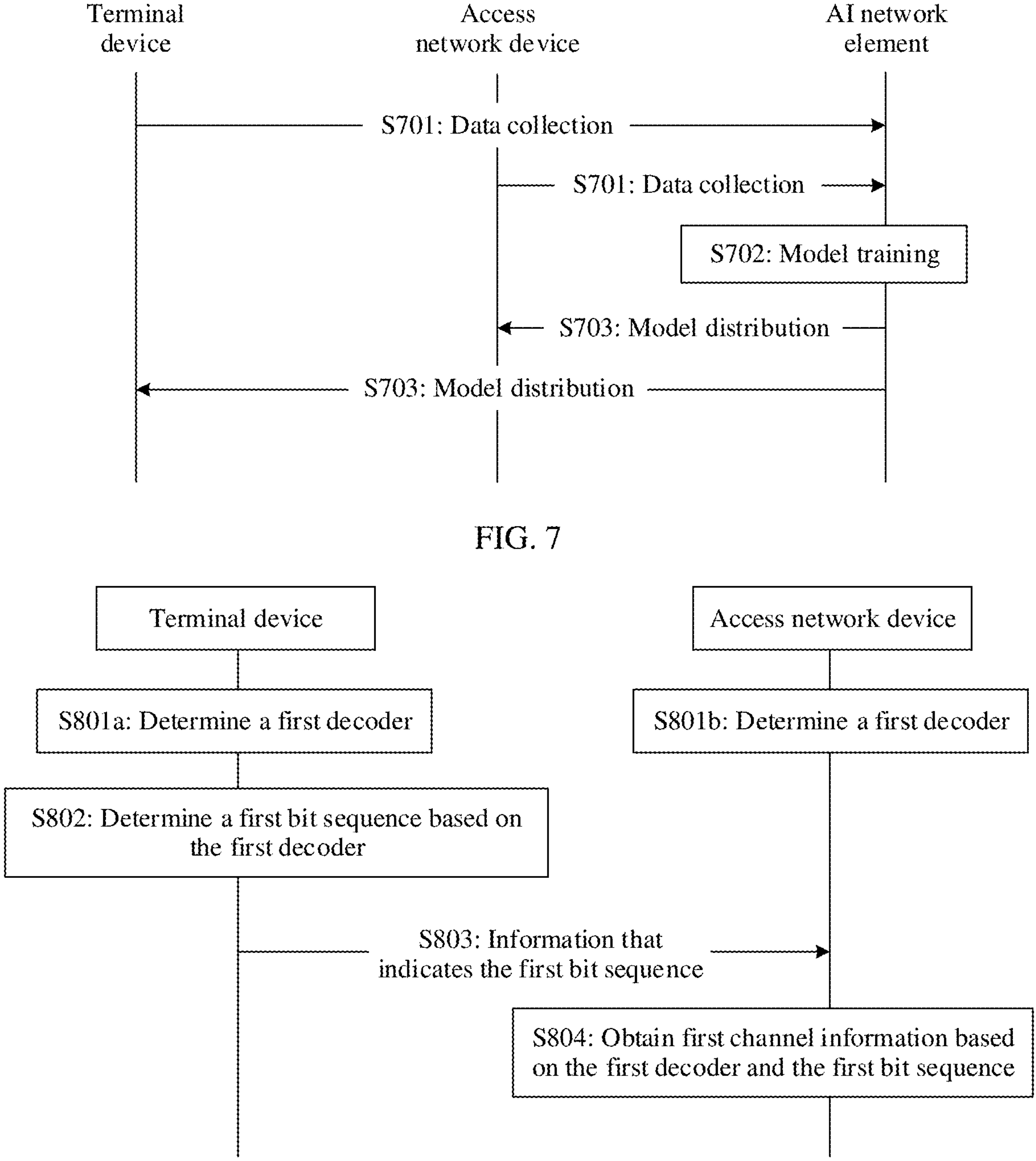
FIG. 7 is a schematic flowchart of model generation according to the present disclosure.
FIG. 8 is a schematic flowchart of a communication method according to the present disclosure.

FIG. 7 shows a model determining procedure. The procedure mainly includes the following steps.

S701: An AI network element collects data from a terminal device and/or an access network device, where the collected data may be used for AI model training. For example, S701 in FIG. 7 shows a case in which the AI network element collects data from the terminal device and the access network device.

In the present disclosure, AI model training is mainly performed to generate an AI model that is used to feed back channel information. Corresponding data that needs to be collected may be a channel matrix between the terminal device and the access network device, or may be an eigenvector corresponding to the channel matrix. The channel matrix in the present disclosure may also be referred to as channel information, channel data, or a channel response.

Optionally, due to different geographical environments and channel conditions (such as indoor, outdoor, a moving speed, a frequency band, and an antenna configuration), the AI network element may classify the collected data during data collection. For example, the AI network element may classify, as a same type of data, data with a same channel propagation environment and a same antenna configuration. Specifically, the access network device or the terminal device may feed back related information to the AI network element. For example, the access network device may feed back, to the AI network element, a cell identifier (identifier, ID) of the access network device, an antenna configuration of the access network device, a geographical location of the access network device, and/or the like. The terminal device may feed back, to the AI network element, at least one piece of the following information: a reference signal received power (reference signal received power, RSRP) measured by the terminal device, an antenna configuration of the terminal device, a geographical location of the terminal device, a moving speed of the terminal device, or the like. The AI network element may classify the collected data based on the information.

Optionally, the AI network element may collect a large amount of data, to avoid problems such as model overfitting and a model bias and to improve performance of a trained model. Specifically, the AI network element may collect a measurement result of channel measurement performed by the terminal device and/or a measurement result of channel measurement performed by the access network device.

In a communication process, the access network device may send, to the terminal device, channel measurement configuration information and a reference signal (reference signal, RS) used for channel measurement. The channel measurement configuration information is used by the terminal device to obtain configuration information for channel measurement. For example, the channel measurement configuration information indicates, to the terminal device, at least one of the following: time information for channel measurement, a type of the reference signal RS used for channel measurement, a time domain resource of the reference signal, a frequency domain resource of the reference signal, a reporting condition of a measurement quantity, and the like. The type of the RS may be a CSI-RS, a demodulation reference signal (demodulation reference signal, DMRS), or the like. Correspondingly, the terminal device receives the reference signal RS, and may perform downlink channel measurement based on the RS. Then, the terminal device may send a measurement result to the AI network element after the downlink channel measurement is performed. Alternatively, the terminal device may send a measurement result to the access network device after the downlink channel measurement is performed, and the access network device forwards the measurement result to the AI network element.

Similarly, the terminal device may also send, to the access network device, a reference signal used for channel measurement, such as a sounding reference signal (sounding reference signal, SRS). The access network device may perform uplink channel measurement based on the SRS, and send a measurement result to the AI network element after the uplink channel measurement is performed. The measurement result of the terminal device includes channel information (such as channel information of a downlink channel) measured by the terminal device, and the measurement result of the access network device includes channel information (such as channel information of an uplink channel) measured by the access network device.

Optionally, after the AI network element collects specific data, the AI network element may alternatively generate data by itself. In a method, the AI network element collects statistics on data distribution, and randomly generates data based on statistical distribution. In another method, the AI network element constructs a generative model that is based on a neural network, so that an output of the generative model and collected actual data are similar in distribution. Then, the generative model is used to generate new data.

Further, data quality is also important for AI model training. If there is an error between measured channel information and actual channel information, the data error affects performance of the AI model. Optionally, the terminal device or the access network device may repeatedly perform measurement on a same channel for a plurality of times to obtain channel information that is obtained through a plurality of times of measurement, and calculate a weighted average value for the channel information that is obtained through a plurality of times of measurement. This improves accuracy of channel information measurement and reduces the data error. In addition, the channel information obtained through measurement has a specific validity period. Therefore, the terminal device or the access network device may further mark a time point at which the channel information is obtained through measurement. The AI network element may refer to the time mark when subsequently performing model training based on the collected data.

S702: The AI network element performs model training based on the collected data, to generate an encoder and/or a decoder.

Specifically, the AI network element may select an appropriate AI model, and train the AI model based on the collected data. The AI model in the present disclosure may include two parts: an encoder f and a decoder g. Herein, the encoder and the decoder each may be a neural network model, or may be a combination of a neural network model and a known channel processing module.

Optionally, the AI network element may select the AI model based on one or more of the following schemes (1) to (3).

(1) With reference to input and output dimension requirements of the encoder and the decoder, the AI network element may select an AI model that meets the dimension requirements.

In some embodiments, an input of the encoder f may be channel information H, and an output of the encoder f may be a bit sequence B=f(H). An input of the decoder g is the bit sequence B, and an output of the decoder g is reconstructed channel information H^=g(B). Alternatively, the input of the encoder may be one or more eigenvectors of the channel information H, and the output of the decoder may be one or more eigenvectors that are reconstructed correspondingly. The channel information may also be referred to as a channel response or channel data. The bit sequence may also be referred to as a feedback bit or a code word. An output dimension of the encoder is the same as an input dimension of the decoder.

An example in which the input of the encoder f is the channel information H and the output of the decoder g is the reconstructed channel information H^ is used for description. It is assumed that there are 512 subcarriers in frequency domain, and there are 32 transmit antenna ports and 4 receive antenna ports in space domain. In this case, channel information input into the encoder may include 512*32*4 dimensional data, and an input dimension (dimension) of the encoder is 512*32*4. If a quantity of bits included in the bit sequence equals 200, the output dimension of the encoder is 200. Correspondingly, the input dimension of the decoder is 200, and an output dimension of the decoder is 512*32*4.

In another optional implementation, the channel information may alternatively be preprocessed (for example, precoded), and the input of the encoder may include channel information (such as a precoding matrix) obtained through preprocessing. For example, inverse Fourier transform (inverse fast Fourier transform, IFFT) may be performed on frequency-domain channel information to obtain time-domain channel information. Then, the time-domain channel information is truncated based on a rule that most energy of the time-domain channel information is distributed within a maximum delay spread range. The input of the encoder includes truncated time-domain channel information, which can reduce an input dimension/output dimension of the AI model. It is assumed that there are 512 subcarriers in frequency domain, there are 32 transmit antenna ports and 4 receive antenna ports in space domain, and a dimension corresponding to a maximum delay spread is 50. In this case, the input dimension of the encoder and the output dimension of the decoder may be both reduced to 50*32*4. This design can greatly reduce computational complexity. Subsequent content in the present disclosure is described by using an example in which the input of the encoder includes channel information, and the output of the decoder includes (reconstructed) channel information.

(2) The AI network element may select an AI model based on a requirement of communication between the terminal device and the access network device. For example, the AI network element may select different AI models when different communication parameters are used for exchanging signals between the access network device and the terminal device. The communication parameters may include a quantity of subcarriers, a quantity of transmit antenna ports, and a quantity of receive antenna ports.

(3) The AI network element may select an AI model based on model performance and model complexity. A neural network is used as an example. If training data is sufficient, more layers and more neurons of the network indicate higher complexity of the AI model and better test performance. If it is set that an amount of training data is fixed, the AI model may be overfitted due to excessive parameters of the model. In other words, the model has good performance for a training set but poor performance for a test set. Therefore, the AI network element may select an AI model based on an actual application scenario. For a terminal device with a strong computing capability, such as a mobile phone, a tablet, or an in-vehicle terminal, the AI network element may use an AI model with a large quantity of parameters. For a terminal device with a weak computing capability, such as an internet of things terminal, the AI network element may use an AI model with a small quantity of parameters.

In the present disclosure, optionally, the AI network element may train different AI models by using different training datasets. Alternatively, the AI network element may train different AI models by using a same training dataset but different initial values.

The following describes a manner in which the AI network element trains an AI model.

The AI network element can select one or more AI models for training. When the AI network element trains one AI model, one decoder and one encoder may be correspondingly generated. A dimension of an output of the decoder is the same as a dimension of an input of the encoder. When the AI network element trains a plurality of AI models, a plurality of decoders and a same encoder corresponding to the plurality of decoders may be generated. A dimension of an output of each of the plurality of decoders is the same as a dimension of an input of the foregoing same encoder. Alternatively, a plurality of encoders and a same decoder corresponding to the plurality of encoders may be generated. A dimension of an input of each of the plurality of encoders is the same as a dimension of an output of the foregoing same decoder. Alternatively, a plurality of decoders and a plurality of encoders may be generated, and the plurality of decoders are in a one-to-one correspondence with the plurality of encoders. A dimension of an output of each decoder is the same as a dimension of an input of an encoder corresponding to the decoder.

Optionally, the AI network element may train the selected AI model by using a stochastic gradient descent method, and may obtain an optimal neural network parameter to a greatest extent by using an iterative algorithm. Optionally, when receiving new data, the AI network element may further update the AI model. The model may be updated periodically. For example, the AI network element may generate a new dataset every specified time period, and train and update the AI model based on the dataset. A value of the specified time period is not limited in the present disclosure. For example, the specified time period may be T seconds, and T is a positive integer. Alternatively, an update of the model may be triggered by an event. For example, when a packet error rate of data transmission exceeds a specified threshold, the AI network element may train and update the model based on a current newest dataset.

Optionally, after the AI network element generates the decoder and/or the encoder, information about the decoder and/or information about the encoder may be defined in a protocol. Then, the access network device and the terminal device may obtain the information about the decoder and/or the information about the encoder based on the predefined information.

Optionally, after generating the decoder and/or the encoder, the AI network element may indicate the information about the decoder and/or the information about the encoder to the terminal device and the access network device based on an actual application requirement. For example, the access network device and/or the terminal device may download the information about the decoder and/or the information about the encoder from the AI network element based on a requirement of the access network device and/or a requirement of the terminal device. Alternatively, the access network device and/or the terminal device may send request information to the AI network element, to request the information about the decoder and/or the information about the encoder. The AI network element sends, based on the request information, the information about the decoder and/or the information about the encoder to an entity that sends the request information. Optionally, the access network device may indicate, to the terminal device, the information about the decoder and/or the information about the encoder that are/is obtained from the AI network element. This part of the solution may also be understood as a model distribution phase that is performed after the AI network element performs data collection and model training. For example, FIG. 7 further shows S703: The AI network element distributes the model to the access network device and the terminal device. Optionally, when distributing the model to the terminal device, the AI network element may directly send model information to the terminal device through signaling, or may forward the model information to the terminal device through the access network device. This is not limited.

In the present disclosure, it is assumed that the decoder or the encoder is implemented in a form of a neural network. Information about the decoder or the encoder includes at least one of the following: a type of the neural network, a quantity of layers in the neural network, a quantity of neurons included in each layer of the neural network, a weight of each neuron, and a bias of each neuron.

In the present disclosure, AI model training may be understood as: obtaining a mapping relationship between an input and an output of the AI model through learning based on a training dataset.

With reference to communication methods provided in Solution 1 to Solution 4, the following describes in detail solutions, such as a solution of feeding back channel information (such as CSI) based on a corresponding AI model after a terminal device and an access network device obtain the AI model.

Solution 1

FIG. 8 shows a communication method. The communication method mainly includes the following procedure.

S801*a*: A terminal device determines a first decoder.

In some embodiments, the first decoder may be deployed on a terminal device side in advance. For example, the first decoder is predefined by a protocol. Optionally, the first decoder may be obtained through offline training in S701 and S702 that are shown in FIG. 7, and then defined in the protocol.

In another optional implementation, an AI network element may obtain the first decoder through S701 and S702 that are shown in FIG. 7, and indicate information about the first decoder to the terminal device. Alternatively, it may be understood that the information about the first decoder may be indicated to the terminal device by the AI network element in a model distribution phase. Specifically, the AI network element may directly send the information about the first decoder to the terminal device. Alternatively, the AI network element may send the information about the first decoder to an access network device, and the access network device forwards the information about the first decoder to the terminal device.

Further, optionally, before indicating the information about the first decoder to the terminal device, the AI network element may obtain a capability of the terminal device. For example, the terminal device may report the capability of the terminal device to the AI network element. The AI network element may determine, based on the capability of the terminal device, whether the terminal device supports feeding back channel information through an encoder, and/or whether the terminal device supports feeding back channel information through a decoder. If the terminal device supports feeding back channel information through a decoder, the AI network element may indicate, to the terminal device, the information about the first decoder generated through the foregoing AI model training. If the terminal device does not support feeding back channel information through a decoder but supports feeding back channel information through an encoder, the AI network element may indicate, to the terminal device, information about an encoder generated through S701 and S702 that are shown in FIG. 7. If the terminal device neither supports feeding back channel information through a decoder nor supports feeding back channel information through an encoder, the AI network element may indicate, to the terminal device, neither the information about the first decoder nor the information about the encoder. Instead, the terminal device may send CSI to the access network device based on a CSI feedback mechanism.

S801*b*: The access network device determines a first decoder.

In some embodiments, the first decoder may be deployed on an access network device side in advance. For example, the first decoder is predefined by a protocol. Optionally, the first decoder may be obtained through offline training in S701 and S702 that are shown in FIG. 7, and then defined in the protocol.

In another optional implementation, the AI network element may obtain the first decoder through S701 and S702 that are shown in FIG. 7, and indicate the information about the first decoder to the access network device. Alternatively, it may be understood that the information about the first decoder may be indicated to the access network device by the AI network element in a model distribution phase.

It should be noted that an execution sequence of S801*a* and S801*b* is not limited in the present disclosure. S801*a* may be performed before or after S801*b* is performed. Alternatively, S801*a* and S801*b* may be simultaneously performed. Optionally, in order to reduce model distribution overheads, some parameters of the AI model may be determined in advance among the terminal device, the access network device, and the AI network element. For example, a type of a neural network, a quantity of layers, parameter information of some neural network layers, parameter information of some neurons at some neural network layers, and/or the like of the AI model may be defined through a protocol. During model distribution, the AI network element may transfer only parameter information of a remaining neural network layer that is not defined and/or parameter information of a neuron that is not defined. In addition, during model update, the AI network element may transfer only the foregoing parameter information of the neural network layer that is not defined and/or the foregoing parameter information of the neuron that is not defined. Parameter information of a neural network layer is used to represent the neural network layer, and may include one or more of weight information of the neural network layer, a bias of the neural network layer, a width of the neural network layer, and a quantity of neurons included in the neural network layer, and another parameter. For example, when the AI model is implemented by using a convolutional neural network CNN, the parameter information of the neural network layer may further include a window coefficient and a window size.

S802: The terminal device determines a first bit sequence based on the first decoder.

An input of the first decoder includes the first bit sequence, and an output of the first decoder includes first channel information.

Optionally, a difference between the first channel information and second channel information is less than or equal to a first threshold, and the second channel information is channel information obtained through measurement on the terminal device side. The first threshold may be a small value that approaches 0, which indicates that the difference between the first channel information and the second channel information is extremely small, and that the first channel information and the second channel information are extremely similar. It may be understood that channel information herein may be a channel response or a channel matrix. Alternatively, the channel information may be replaced by a precoding matrix.

Specifically, before S802 is performed, the terminal device may obtain the second channel information through measurement in the following manner: The terminal device may receive channel measurement configuration information and a reference signal RS used for channel measurement that are sent by the access network device. The terminal device may perform channel measurement based on the RS, to obtain the second channel information. For the channel measurement configuration information and the reference signal RS used for channel measurement, refer to definitions in S701 for understanding. Details are not described herein in the present disclosure.

Specifically, determining of the first bit sequence may be considered as an optimization problem. A specific manner of determining the first bit sequence is not limited in the present disclosure. For example, the terminal device may determine the first bit sequence by using the following expression:

$$B^* = \arg\min_B L(H, g(B)).$$

H represents the channel information obtained through measurement on the terminal device side, that is, the second channel information. B represents an input variable, and g(B) represents channel information output by the first decoder when B is used as the input of the first decoder. arg represents finding an optimal solution, $\min_B L(H, g(B))$ represents that a condition to be met to find the optimal solution is to minimize a difference between g(B) and H, and B* may be understood as the optimal solution to the foregoing optimization problem. Optionally, the input variable B may be a binary number. The input variable B may be understood as a to-be-optimized bit sequence, and a dimension of the to-be-optimized bit sequence is the same as an input dimension of the first decoder. B* is the first bit sequence to be determined. Alternatively, the input variable B may be a continuous variable, and the optimal solution B* is obtained after optimization is performed. Then, quantization processing is performed on B* to obtain the first bit sequence. The following embodiments are described by using an example in which the input variable B is the to-be-optimized bit sequence.

An objective function L(H, g(B)) represents the difference between g(B) and H. Optionally, a mean square error may be specifically used to represent the difference, as shown in the following expression:

$$L(H, g(B)) = \|H - g(B)\|^2.$$

Figure 9:
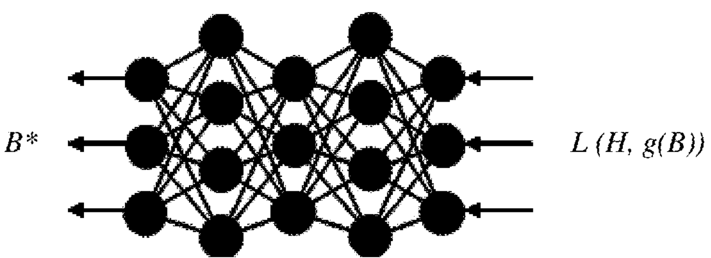
FIG. 9 is a schematic flowchart of calculating an optimal solution according to the present disclosure.

Optionally, for a given objective function that is to be optimized and a neural network model (that is, the first decoder), as shown in FIG. 9, a backpropagation algorithm may be used to calculate an optimal solution B* for the input variable B of the first decoder. It should be noted that, the backpropagation algorithm in the present disclosure does not change a weight of the neural network, but only optimizes an input of the neural network. In other words, a gradient of the objective function relative to the input variable B needs to be calculated, and is represented by the following formula:

$$\Delta B = \frac{\partial L(H, g(B))}{\partial B}.$$

∂ a represents a partial derivative symbol, L(H, g(B)) represents the objective function, ΔB represents the gradient of the objective function relative to the input variable B, and ΔB may equal a ratio of a partial derivative of L(H, g(B)) to a partial derivative of B.

Specifically, the terminal device may randomly determine an initial to-be-optimized bit sequence based on the input dimension of the first decoder, where a dimension of the initial to-be-optimized bit sequence is the same as the input dimension of the first decoder. The terminal device performs an iterative update based on the initial to-be-optimized bit sequence, to determine the first bit sequence. For example, the terminal device may determine an $(i+1)^{th}$ to-be-optimized bit sequence based on an $i^{th}$ to-be-optimized bit sequence. In this case, a condition 1 or a condition 2 may be met. Condition 1: An objective function L(H, g(B)) obtained by using the $(i+1)^{th}$ to-be-optimized bit sequence as the input variable B is smaller than an objective function obtained by using the $(i+1)^{th}$ to-be-optimized bit sequence as the input variable B. Condition 2: A first difference is smaller than a second difference. The first difference refers to a difference that is between channel information output by the first decoder and the second channel information obtained by the terminal device through measurement and that exists when the input of the first decoder includes the $(i+1)^{th}$ to-be-optimized bit sequence. The second difference refers to a difference that is between channel information output by the first decoder and the second channel information obtained by the terminal device through measurement and that exists when the input of the first decoder includes the $i^{th}$ to-be-optimized bit sequence.

Specifically, the terminal device may iteratively update the to-be-optimized bit sequence based on the initial to-be-optimized bit sequence and a gradient descent algorithm, to determine the first bit sequence. For example, the terminal device may determine the $(i+1)^{th}$ to-be-optimized bit sequence based on the $i^{th}$ to-be-optimized bit sequence and the gradient descent algorithm. Specifically, reference may be made to the following expression (1) or (2) for execution:

$$B^{i+1} = B^i - \sigma * \frac{\partial L(H, g(B^i))}{\partial B^i},$$

where σ is a positive number (1)

$$B^{i+1} = B^i + \sigma * \frac{\partial L(H, g(B^i))}{\partial B^i}$$

where σ is a negative number (2)

In the foregoing expression (1) or (2), $B^{i+1}$ represents the $(i+1)^{th}$ to-be-optimized bit sequence, and $B^i$ represents the $i^{th}$ to-be-optimized bit sequence, where i ranges from 1 to M−1, and M is a positive integer greater than or equal to 2. If the foregoing initial to-be-optimized bit sequence corresponds to a case in which i equals 1, the initial to-be-optimized bit sequence may alternatively be referred to as a first to-be-optimized bit sequence. σ represents a gradient descent step. $L(H, g(B^i))$ represents a difference between $i^{th}$ channel information and the second channel information, and may be understood as an expression of an objective function of the gradient descent algorithm when the input variable B is the $i^{th}$ to-be-optimized bit sequence $B^i$. The second channel information is the channel information H obtained through measurement on the terminal device side, the input of the first decoder includes the $i^{th}$ to-be-optimized bit sequence $B^i$, and the output of the first decoder includes the $i^{th}$ channel information $g(B^i)$.

$$\frac{\partial L(H, g(B^i))}{\partial B^i}$$

represents a gradient of the objective function of the gradient descent algorithm relative to the $i^{th}$ to-be-optimized bit sequence when the input variable B is the $i^{th}$ to-be-optimized bit sequence.

The terminal device may determine an $M^{th}$ to-be-optimized bit sequence as the first bit sequence. In some embodiments, M may be a preset value. In other words, a quantity of times that the terminal device iteratively updates the to-be-optimized bit sequence based on the gradient descent algorithm is preset. The preset value may be set based on historical experience, model training, or an actual requirement. This is not limited in the present disclosure. In another optional implementation, M is indicated by the access network device to the terminal device through signaling. In another optional implementation, M is a variable and is related to a quantity of iterations that need to be performed for the objective function of the foregoing gradient descent algorithm to reach a minimum value.

In addition, it should be noted that a dimension of $B^{i+1}$ is the same as a dimension of $B^i$, and a dimension of each of $B^{i+1}$ and $B^i$ is the same as the input dimension of the first decoder. A value of $B^{i+1}$ is the same as or similar to a calculation result of $$B^i - \sigma\frac{\partial L(H, g(B^i))}{\partial B^i}.$$

Alternatively, it may be understood that a to-be-optimized bit sequence iteratively updated by using the gradient descent algorithm may be a bit sequence selected from a bit sequence set that meets the input dimension of the first decoder. In a case in which M is the preset value, the first bit sequence may be an $M^{th}$ bit sequence selected from the bit sequence set by the terminal device by using the gradient descent algorithm. In a case in which M is the variable, the first bit sequence may be a bit sequence that is in the bit sequence set and that can enable the objective function of the gradient descent algorithm to reach the minimum value. In addition, in actual application, a method such as a momentum method or dynamic step adjustment may be used to further optimize the gradient descent algorithm.

S803: The terminal device sends, to the access network device, information that indicates the first bit sequence.

The information that indicates the first bit sequence may be the first bit sequence. Alternatively, in order to reduce overheads, the information that indicates the first bit sequence may be, for example, a number corresponding to the first bit sequence. The information that indicates the first bit sequence may be designed based on an actual requirement, provided that the information can be understood (or parsed) by the terminal device and the access network device. This is not limited in the present disclosure.

Optionally, the terminal device may include, in the CSI, the information that indicates the first bit sequence; and send the CSI to the access network device, so that the access network device obtains the information that indicates the first bit sequence.

S804: The access network device obtains first channel information based on the first decoder and the first bit sequence.

The input of the first decoder includes the first bit sequence, and the output of the first decoder includes the first channel information. Specifically, in correspondence with the implementation in S802, the first bit sequence is $B^*$, and the first decoder is recorded as g. The access network device may calculate the first channel information, which is also referred to as reconstructed first channel information $\hat{H}$, based on the following formula: $\hat{H}=g(B^*)$.

Optionally, the access network device may send data to the terminal device based on the first channel information. The data sent by the access network device to the terminal device may be carried on a downlink channel, for example, carried on a physical downlink shared channel (physical downlink shared channel, PDSCH). Alternatively, it may be understood as that the access network device transmits the PDSCH to the terminal device. Optionally, the access network device may send another downlink channel, such as a physical downlink control channel (physical downlink control channel, PDCCH), to the terminal device based on the first channel information.

The present disclosure is described by using an example in which the access network device sends the data based on first channel information. The access network device may determine, based on the first channel information, a transmission parameter used to send the data to the terminal device. The transmission parameter is used by the access network device to send the data to the terminal device. The transmission parameter may include at least one of a modulation order and an encoding rate of channel encoding that are used to send the data to the terminal device, and/or a codebook used for precoding when the data is transmitted to the terminal device.

In the present disclosure, a decoder is introduced on the terminal device side, and a bit sequence to be fed back is derived from a perspective of the decoder. In this way, a channel reconstructed by the access network device based on the feedback information is approximate to an actually measured channel to a greatest extent, and an error between the reconstructed channel and the actually measured channel is reduced. Therefore, an information loss can be reduced, and channel information feedback precision can be improved.

Solution 2

Figure 10:
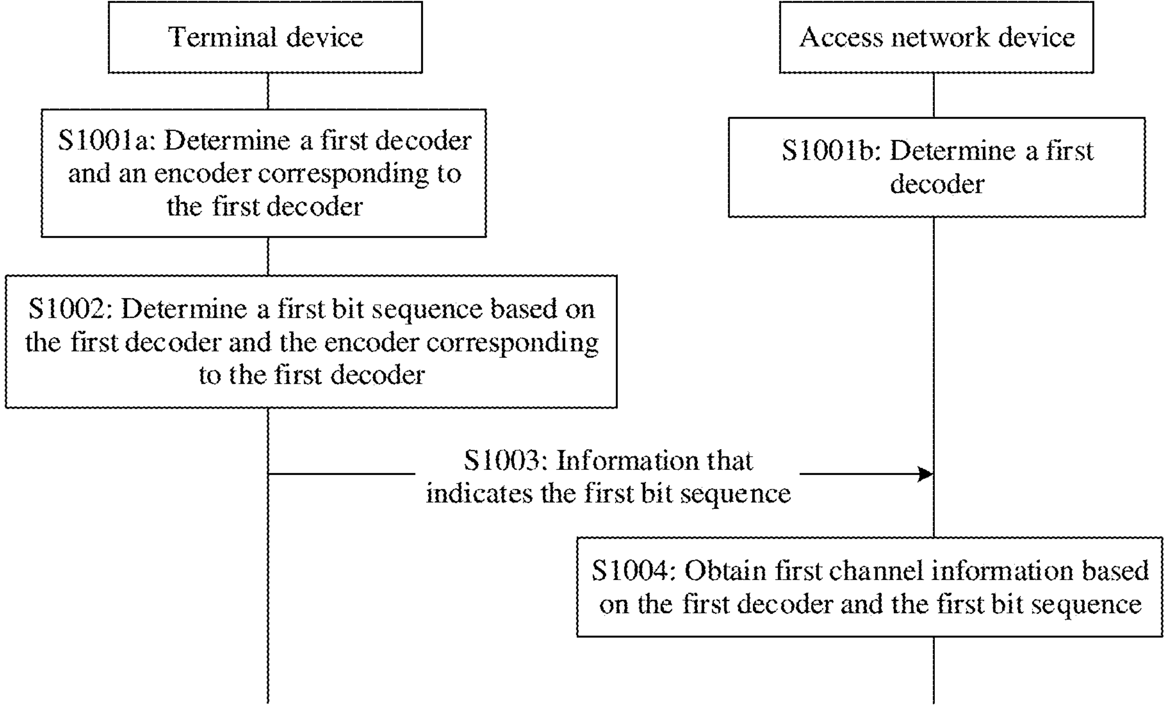
FIG. 10 is a schematic flowchart of a communication method according to the present disclosure.

FIG. 10 shows a communication method. The communication method mainly includes the following procedure.

S1001*a*: A terminal device determines a first decoder and an encoder corresponding to the first decoder.

In some embodiments, the first decoder and the encoder corresponding to the first decoder may be deployed on a terminal device side in advance. For example, the first decoder and the encoder corresponding to the first decoder are predefined by a protocol. Optionally, the first decoder and the encoder corresponding to the first decoder may be obtained through offline training in S701 and S702 that are shown in FIG. 7, and then defined in the protocol.

In another optional implementation, an AI network element may obtain the first decoder and the encoder corresponding to the first decoder through S701 and S702 that are shown in FIG. 7; and indicate information about the first decoder and information about the encoder to the terminal device. Alternatively, it may be understood that the information about the first decoder and the information about the encoder may be indicated by the AI network element to the terminal device in a model distribution phase. Specifically, the AI network element may directly send the information about the first decoder and the information about the encoder to the terminal device. Alternatively, the AI network element may send the information about the first decoder and the information about the encoder to an access network device, and the access network device forwards the information about the first decoder and the information about the encoder to the terminal device.

Further, optionally, before indicating the information about the first decoder and the information about the encoder to the terminal device, the AI network element may obtain a capability of the terminal device. For example, the terminal device may report the capability of the terminal device to the AI network element. The AI network element may determine, based on the capability of the terminal device, whether the terminal device supports feeding back channel information through an encoder, and/or whether the terminal device supports feeding back channel information through a decoder. If the terminal device supports feeding back channel information through a decoder, the AI network element may indicate, to the terminal device, the information about the first decoder and the information about the encoder generated through the foregoing AI model training. If the terminal device does not support feeding back channel information through a decoder but supports feeding back channel information through an encoder, the AI network element may indicate, to the terminal device, only the information about the encoder generated through S701 and S702 that are shown in FIG. 7. If the terminal device neither supports feeding back channel information through a decoder nor supports feeding back channel information through an encoder, the AI network element may indicate, to the terminal device, neither the information about the first decoder nor the information about the encoder. Instead, the terminal device may send CSI to the access network device based on a CSI feedback mechanism.

S1001*b*: The access network device determines a first decoder.

For a specific method, refer to S801*b*. S801*b* corresponds to S1001*b*, and S801*a* corresponds to S1001*a*.

S1002: The terminal device determines a first bit sequence based on the first decoder and the encoder corresponding to the first decoder.

For a description of the first decoder and a description of measuring second channel information by the terminal device, refer to S802. Details are not described herein.

Refer to S802. Determining of the first bit sequence is considered as an optimization problem. An expression and an objective function L(H, g(B)) that are used by the terminal device to determine the first bit sequence may be understood based on definitions in S802. Details are not described herein.

Figure 11:
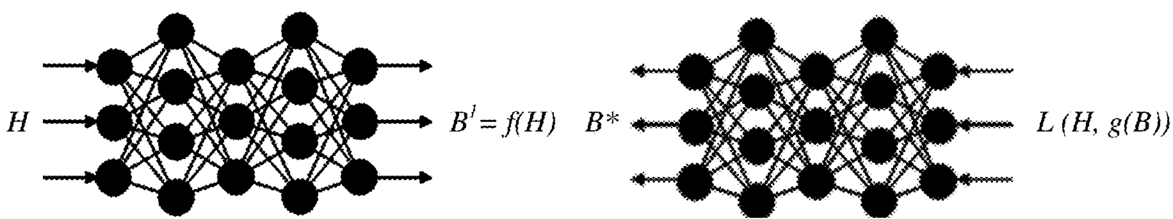
FIG. 11 is a schematic flowchart of calculating an optimal solution according to the present disclosure.

Further, for a given objective function that is to be optimized and a neural network model (that is, the first decoder), as shown in FIG. 11, a backpropagation algorithm may be used to calculate an optimal solution B* for an input variable B of the first decoder. It should be noted that, the backpropagation algorithm in the present disclosure does not change a weight of a neural network, but only optimizes an input of the neural network. In other words, a gradient of the objective function relative to the input variable B needs to be calculated, and is represented by the following formula:

$$\Delta B = \frac{\partial L(H, g(B))}{\partial B}.$$

∂ a represents a partial derivative symbol, L(H, g(B)) represents the objective function, ΔB represents the gradient of the objective function relative to the input variable B, and ΔB may equal a ratio of a partial derivative of L(H, g(B)) to a partial derivative of B. Optionally, in S1002, the terminal device may encode, based on the encoder corresponding to the first decoder, the second channel information obtained by the terminal device through measurement, to determine an initial to-be-optimized bit sequence. For example, FIG. 11 further shows a process of generating the initial to-be-optimized bit sequence $B^1$ by using the encoder, where $B^1$=f( ), f represents the encoder, and H represents the second channel information obtained by the terminal device through measurement. A dimension of the initial to-be-optimized bit sequence is the same as an input dimension of the first decoder.

Optionally, the terminal device may perform an iterative update on the initial to-be-optimized bit sequence, to determine the first bit sequence. For example, the terminal device may determine an $(i+1)^{th}$ to-be-optimized bit sequence based on an $i^{th}$ to-be-optimized bit sequence. In this case, a condition 1 or a condition 2 may be met. Condition 1: An objective function L(H, g(B)) obtained by using the $(i+1)^{th}$ to-be-optimized bit sequence as the input variable B is smaller than an objective function obtained by using the $(i+1)^{th}$ to-be-optimized bit sequence as the input variable B. Condition 2: A first difference is smaller than a second difference. The first difference refers to a difference that is between channel information output by the first decoder and the second channel information obtained by the terminal device through measurement and that exists when an input of the first decoder includes the $(i+1)^{th}$ to-be-optimized bit sequence. The second difference refers to a difference that is between channel information output by the first decoder and the second channel information obtained by the terminal device through measurement and that exists when the input of the first decoder includes the $i^{th}$ to-be-optimized bit sequence.

Specifically, the terminal device may iteratively update the to-be-optimized bit sequence based on the initial to-be-optimized bit sequence and a gradient descent algorithm, to determine the first bit sequence. For example, the terminal device may determine the $(i+1)^{th}$ to-be-optimized bit sequence based on the $i^{th}$ to-be-optimized bit sequence and the gradient descent algorithm. Specifically, reference may be made to the following expression (1) for execution:

$$B^{i+1} = B^i - \sigma\frac{\partial L(H, g(B^i))}{\partial B^i},$$

where σ is a positive number. Alternatively, reference may be made to the following expression (2) for execution:

$$B^{i+1} = B^i + \sigma\frac{\partial L(H, g(B^i))}{\partial B^i},$$

where σ is a negative number. When i ranges of 1, $B^1$=f( ). For other descriptions of the expression (1) or the expression (2), refer to S802 for understanding. Details are not described herein in the present disclosure.

S1003: The terminal device sends, to the access network device, information that indicates the first bit sequence.

For specific content, refer to S803.

S1004: The access network device obtains first channel information based on the first decoder and the first bit sequence.

For specific content, refer to S804.

In the present disclosure, a decoder and an encoder are introduced on the terminal device side. With the help of the encoder, the terminal device can more quickly derive, from a perspective of the decoder, a bit sequence to be fed back.

This reduces computational complexity. In this design, a channel reconstructed by the access network device based on a bit sequence can be approximate to an actually measured channel to a greatest extent, and an error between the reconstructed channel and the actually measured channel is reduced. Therefore, an information loss can be reduced, and channel information feedback precision can be improved.

Solution 3

Figures 12, 13:
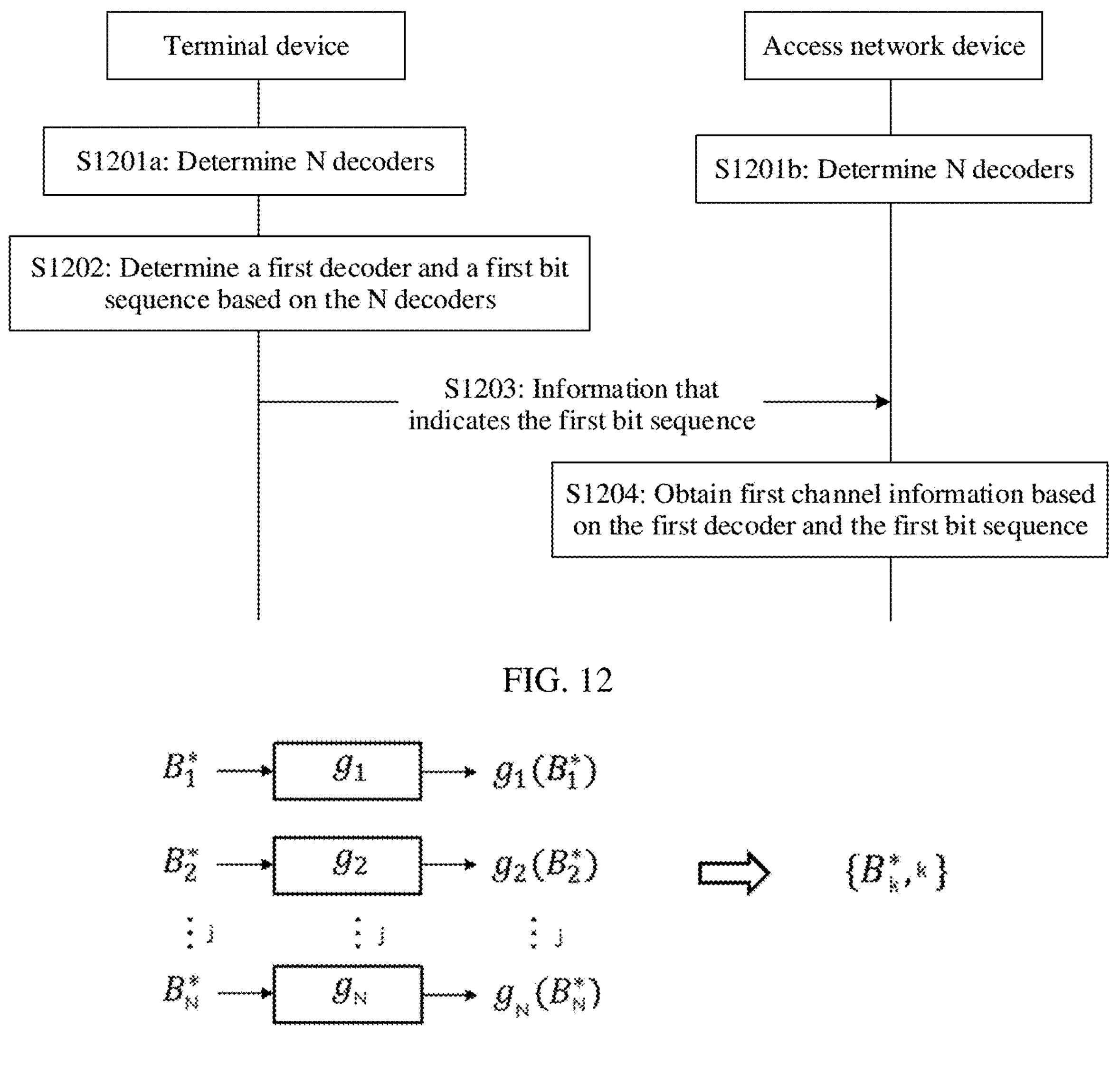
FIG. 12 is a schematic flowchart of a communication method according to the present disclosure.
FIG. 13 is a schematic flowchart of selecting a decoder according to the present disclosure.

FIG. 12 shows a communication method. The communication method mainly includes the following procedure.

S1201*a*: A terminal device determines N decoders. N is a positive integer greater than or equal to 1.

In some embodiments, the N decoders may be deployed on a terminal device side in advance. For example, the N decoders are predefined by a protocol. Optionally, the N decoders may be obtained through offline training in S701 and S702 that are shown in FIG. 7, and then defined in the protocol.

In another optional implementation, an AI network element may obtain the N decoders through S701 and S702 that are shown in FIG. 7, and indicate information about the N decoders to the terminal device. Alternatively, it may be understood that the information about the N decoders may be indicated to the terminal device by the AI network element in a model distribution phase. Specifically, the AI network element may directly send the information about the N decoders to the terminal device. Alternatively, the AI network element may send the information about the N decoders to an access network device, and the access network device forwards the information about the N decoders to the terminal device.

Further, optionally, before indicating the information about the N decoders to the terminal device, the AI network element may obtain a capability of the terminal device. For example, the terminal device may report the capability of the terminal device to the AI network element. The AI network element may determine, based on the capability of the terminal device, whether the terminal device supports feeding back channel information through an encoder, and/or whether the terminal device supports feeding back channel information through a decoder. If the terminal device supports feeding back channel information through a decoder, the AI network element may indicate, to the terminal device, the information about the N decoders generated through the foregoing AI model training. If the terminal device does not support feeding back channel information through a decoder but supports feeding back channel information through an encoder, the AI network element may indicate, to the terminal device, information about an encoder generated through S701 and S702 that are shown in FIG. 7. If the terminal device neither supports feeding back channel information through a decoder nor supports feeding back channel information through an encoder, the AI network element may indicate, to the terminal device, neither the information about the N decoders nor the information about the encoder. Instead, the terminal device may send CSI to the access network device based on a CSI feedback mechanism.

S1201*b*: The access network device determines N decoders. N is a positive integer.

In some embodiments, the N decoders may be deployed on an access network device side in advance. For example, the N decoders are predefined by a protocol. Optionally, the N decoders may be obtained through offline training in S701 and S702 that are shown in FIG. 7, and then defined in the protocol.

In another optional implementation, the AI network element may obtain the N decoders through S701 and S702 that are shown in FIG. 7, and indicate the information about the N decoders to the access network device. Alternatively, it may be understood that the information about the N decoders may be indicated to the access network device by the AI network element in a model distribution phase.

It should be noted that an execution sequence of S1201*a* and S1201*b* is not limited in the present disclosure. S1201*a* may be performed before or after S1201*b* is performed. Alternatively, S1201*a* and S1201*b* may be simultaneously performed. Optionally, in order to reduce model distribution overheads, for a specific distribution method of a model, refer to a corresponding method corresponding to FIG. 8. Details are not described herein.

S1202: The terminal device determines a first decoder and a first bit sequence based on the N decoders.

An input of the first decoder includes the first bit sequence, and an output of the first decoder includes first channel information.

Optionally, a difference between the first channel information and second channel information is less than a first threshold, and the second channel information is channel information obtained through measurement on the terminal device side. The first threshold may be a small value that approaches 0, which indicates that the difference between the first channel information and the second channel information is extremely small, and that the first channel information and the second channel information are extremely similar. It may be understood that channel information herein may be a channel response or a channel matrix. Alternatively, the channel information may be replaced by a precoding matrix.

Before S1202 is performed, the terminal device may measure the second channel information. For a description of measuring the second channel information by the terminal device, refer to S802. Details are not described herein.

Specifically, when N equals 1, the terminal device may determine the obtained one decoder as the first decoder. Then, the terminal device may determine the first bit sequence based on the first decoder according to the foregoing implementation of S802. Details are not described in the present disclosure.

When N is greater than 1, the terminal device may determine the first decoder and the first bit sequence in the following two optional manners:

In some embodiments, the terminal device may determine one of the N decoders (for example, any decoder, a randomly determined decoder, or a decoder obtained based on an internal algorithm on the terminal device side, which is not limited) as the first decoder. Then, the terminal device may determine the first bit sequence based on the first decoder according to the foregoing implementation of S802. Details are not described in the present disclosure.

In another optional implementation, for each of the N decoders, the terminal device may calculate an optimal solution for each of the N decoders according to the foregoing implementation of S802. Then, optimal solutions for the decoders are compared, and the first decoder that meets the following condition is determined from the N decoders: The output of the first decoder in the N decoders is most approximate to the second channel information, where the second channel information is the channel information obtained through measurement on the terminal device side. In this manner, a plurality of decoders are introduced, and a final bit sequence (that is, the first bit sequence) is determined by comparing optimal solutions for the plurality of decoders. This can further improve channel information feedback precision and performance of a communication system.

For an implementation of determining an optimal solution for any one of the decoders in a case in which N is greater than 1, refer to the implementation of determining an optimal solution for the first decoder in S802. Details are not described herein.

Further, an optimal solution for a $j^{th}$ decoder in the N decoders is recorded as $$B_j^*.$$

When $$B_j^*$$

is used as an input of the $j^{th}$ decoder, an output of the $j^{th}$ decoder may be represented as $$g_j(B_j^*).$$

As shown in FIG. 13, the terminal device may select the first decoder from the N decoders by using, as a selection condition, that an output of the decoder needs to be most approximate to the second channel information obtained by the terminal device through measurement; and determine the output of the first decoder as the first bit sequence. Specifically, the foregoing selection condition may be described by using the following expression:

$$L(H, g_k(B_k^*)) = \min_j L\big(H, g_j(B_j^*)\big),$$

where $j$ is a positive integer from 1 to $N$.

where j is a positive integer from 1 to N.

$g_k$ represents the first decoder, $B_k$* represents the first bit sequence, k is a positive integer, and k is less than or equal to N. H can represent the second channel information obtained through measurement on the terminal device side. L(H, $g_k(B_k$*)) may be understood as an objective function corresponding to the first decoder, and is used to indicate a difference between the output $g_k(B_k$*) of the first decoder and the second channel information obtained by the terminal device through measurement. L(H, $g_j(B_j$*)) may be understood as an objective function corresponding to the $j^{th}$ decoder, and is used to indicate a difference between an output $g_j(B_j$*) of the $j^{th}$ decoder and the second channel information obtained by the terminal device through measurement.

$$L\big(H, g_j(B_j^*)\big)$$

indicates that a minimum value is used. In the N decoders, the objective function corresponding to the first decoder is the smallest.

S1203: The terminal device sends, to the access network device, information that indicates the first bit sequence.

For specific content, refer to S803. In addition, optionally, the terminal device may further send, to the access network device, information that indicates the first decoder, for example, a number k of the first decoder. The access network device may determine the first decoder based on the information that indicates the first decoder. For example, the access network device determines, based on the number k of the first decoder, the corresponding first decoder in the N decoders that are determined in S1201*b*.

S1204: The access network device obtains the first channel information based on the first decoder and the first bit sequence.

For specific content, refer to S804.

In the present disclosure, one or more decoders are introduced on the terminal device side, and a bit sequence to be fed back is derived from a perspective of the one or more decoders. In this way, a channel reconstructed by the access network device based on the feedback information is approximate to an actually measured channel to a greatest extent, and an error between the reconstructed channel and the actually measured channel is reduced. Therefore, an information loss can be reduced, and channel information feedback precision can be improved.

Solution 4

Figures 14, 15:
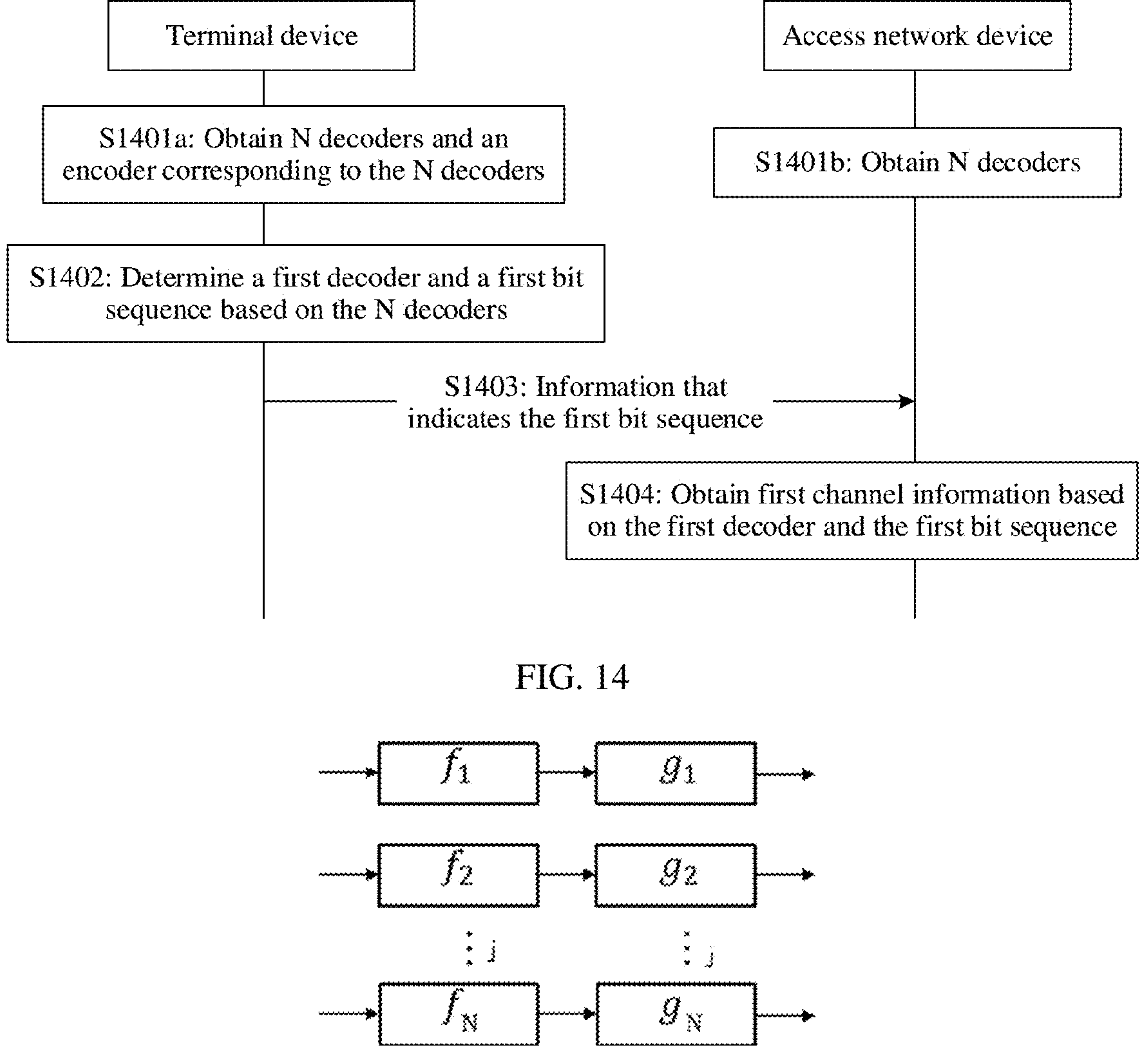
FIG. 14 is a schematic flowchart of a communication method according to the present disclosure.
FIG. 15 is a schematic diagram of a correspondence between an encoder and a decoder according to the present disclosure.

FIG. 14 shows a communication method. The communication method mainly includes the following procedure.

S1401*a*: A terminal device obtains N decoders and an encoder corresponding to the N decoders.

N is a positive integer greater than or equal to 1. The N decoders may correspond to a same encoder. Alternatively, when N is greater than 1, different decoders in the N decoders may correspond to different encoders. In other words, the terminal device may obtain the N decoders and N encoders, where the N decoders are in a one-to-one correspondence with the N encoders. Alternatively, when N is greater than 1, different decoders in the N decoders correspond to a same encoder or different encoders. In other words, some decoders in the N decoders may correspond to a same encoder. For example, the terminal device may obtain the N decoders and N/2 encoders, and any one of the N/2 encoders may correspond to two of the N decoders.

In some embodiments, the N decoders and the encoder corresponding to the N decoders may be deployed on a terminal device side in advance. For example, the N decoders and the encoder corresponding to the N decoders are predefined by a protocol. Optionally, the N decoders and the encoder corresponding to the N decoders may be obtained through offline training in S701 and S702 that are shown in FIG. 7, and then defined in the protocol.

In another optional implementation, an AI network element may obtain the N decoders and the encoder corresponding to the N decoders through S701 and S702 that are shown in FIG. 7, and indicate information about the N decoders and information about the encoder corresponding to the N decoders to the terminal device. Alternatively, it may be understood that the information about the N decoders and the information about the encoder corresponding to the N decoders may be indicated to the terminal device by the AI network element in a model distribution phase. Specifically, the AI network element may directly send the information about the N decoders and the information about the encoder corresponding to the N decoders to the terminal device. Alternatively, the AI network element may send the information about the N decoders and the information about the encoder corresponding to the N decoders to an access network device, and the access network device forwards the information about the N decoders and the information about the encoder corresponding to the N decoders to the terminal device.

Further, optionally, before indicating the information about the N decoders and the information about the encoder corresponding to the N decoders to the terminal device, the AI network element may obtain a capability of the terminal device. For example, the terminal device may report the capability of the terminal device to the AI network element. The AI network element may determine, based on the capability of the terminal device, whether the terminal device supports feeding back channel information through an encoder, and/or whether the terminal device supports feeding back channel information through a decoder. If the terminal device supports feeding back channel information through a decoder, the AI network element may indicate, to the terminal device, the information about the N decoders and the information about the encoder corresponding to the N decoders generated through the foregoing AI model training. If the terminal device does not support feeding back channel information through a decoder but supports feeding back channel information through an encoder, the AI network element may indicate, to the terminal device, only the information about the encoder generated through S701 and S702 that are shown in FIG. 7. If the terminal device neither supports feeding back channel information through a decoder nor supports feeding back channel information through an encoder, the AI network element may indicate, to the terminal device, neither the information about the N decoders nor the information about the encoder corresponding to the N decoders. Instead, the terminal device may send CSI to the access network device based on a CSI feedback mechanism.

S1401*b*: The access network device obtains N decoders. For specific content, refer to S1201*b*.

S1402: The terminal device determines a first decoder and a first bit sequence based on the N decoders.

For a description of the first decoder and a description of measuring second channel information by the terminal device, refer to S1202. Details are not described herein. Specifically, when N equals 1, the terminal device may determine the obtained one decoder as the first decoder. Then, the terminal device may determine the first bit sequence based on the first decoder and an encoder corresponding to the first decoder according to the implementation of S1002. Details are not described in the present disclosure.

When N is greater than 1, a manner in which the terminal device determines the first decoder and the first bit sequence is similar to a corresponding description in S1202. In S1202, for an implementation of determining an optimal solution for any one of the decoders when N is greater than 1, refer to the implementation of determining an optimal solution for the first decoder in S802. Different from S1202, in S1402, for an implementation of determining an optimal solution for any one of the decoders when N is greater than 1, refer to the implementation of determining an optimal solution for the first decoder in S1002. In S1402, for any decoder, an encoder corresponding to the decoder is configured to determine a corresponding initial to-be-optimized bit sequence $B^1$. Specifically, that different decoders in the N decoders may correspond to different encoders is used as an example. FIG. 15 shows a case in which the terminal device obtains N decoders and N encoders, and the N decoders are in a one-to-one correspondence with the N encoders. The terminal device may obtain, through an encoder $f_j$ corresponding to a $j^{th}$ decoder, an initial to-be-optimized bit sequence $B^1$ corresponding to the $j^{th}$ decoder, where $B^1=f_j(\ )$, and H represents the second channel information obtained by the terminal device through measurement. A dimension of the initial to-be-optimized bit sequence $B^1$ is the same as an input dimension of the $j^{th}$ decoder.

S1403: The terminal device sends, to the access network device, information that indicates the first bit sequence.

For specific content, refer to S803. In addition, optionally, the terminal device may further send, to the access network device, information that indicates the first decoder, for example, a number (an index or an identifier) k of the first decoder. The access network device may determine the first decoder based on the information that indicates the first decoder. For example, the access network device determines, based on the number k of the first decoder, the corresponding first decoder in the N decoders that are determined in S1401*b*. Optionally, the terminal device may alternatively send, to the access network device, information that indicates a first encoder, for example, a number k of the first encoder. The access network device may determine the first decoder based on the information that indicates the first encoder. For example, the access network device determines, based on the number k of the first encoder, the first decoder that is in the N decoders determined in S1201*b* and that corresponds to the first encoder.

S1404: The access network device obtains first channel information based on the first decoder and the first bit sequence.

For specific content, refer to S804.

In the present disclosure, a decoder and an encoder are introduced on the terminal device side. With the help of the encoder, the terminal device can more quickly derive, from a perspective of the decoder, a bit sequence to be fed back. This reduces computational complexity. In this design, a channel reconstructed by the access network device based on a bit sequence can be approximate to an actually measured channel to a greatest extent, and an error between the reconstructed channel and the actually measured channel is reduced. Therefore, an information loss can be reduced, and channel information feedback precision can be improved.

The foregoing separately describes the methods provided in the present disclosure from perspectives of an access network device, a terminal device, an AI network element, and interaction among the access network device, the terminal device, and the AI network element. To implement functions in the foregoing methods, the access network device, the terminal device, and the AI network element each may include a hardware structure and/or a software module, and the foregoing functions are implemented in a form of the hardware structure, the software module, or a combination of the hardware structure and the software module. Whether a specific function in the foregoing functions is performed by the hardware structure, the software module, or the combination of the hardware structure and the software module depends on particular applications and design constraints of the technical solutions.

Figure 16:
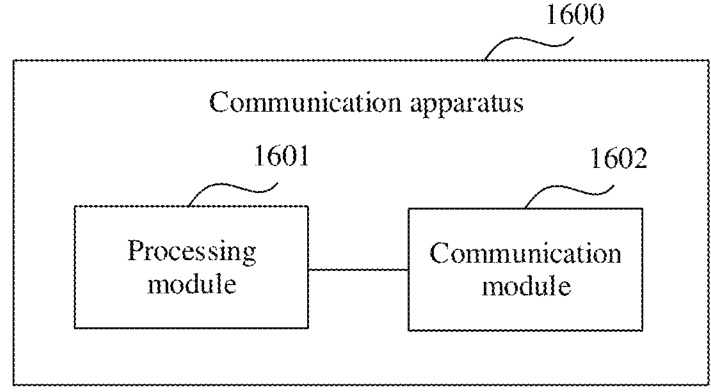
FIG. 16 is a schematic diagram of a structure of a communication apparatus according to the present disclosure.

Based on a same concept, as shown in FIG. 16, the present disclosure provides a communication apparatus 1600. The communication apparatus 1600 includes a processing module 1601 and a communication module 1602. The communication apparatus 1600 may be an access network device, or may be a communication apparatus that is applied to an access network device or used in cooperation with an access network device and that can implement a communication method performed on an access network device side. Alternatively, the communication apparatus 1600 may be a terminal device, or may be a communication apparatus that is applied to a terminal device or used in cooperation with a terminal device and that can implement a communication method performed on a terminal device side.

The communication module may also be referred to as a transceiver module, a transceiver, a transceiver, a transceiver apparatus, or the like. The processing module may also be referred to as a processor, a processing board, a processing unit, a processing apparatus, or the like. Optionally, a component that is in the communication module and that is configured to implement a receiving function may be considered as a receiving unit. It should be understood that the communication module is configured to perform a sending operation and a receiving operation on the access network device side or the terminal device side in the foregoing method embodiments, and a component that is in the communication module and that is configured to implement a sending function is considered as a sending unit. In other words, the communication module includes the receiving unit and the sending unit. When the communication apparatus 1600 is applied to the terminal device, the receiving unit included in the communication module 1602 of the communication apparatus is configured to perform a receiving operation on the terminal device side, for example, receive information from an access network device. The sending unit included in the communication module 1602 of the communication apparatus is configured to perform a sending operation on the terminal device side, for example, send a first bit sequence to the access network device. When the communication apparatus 1600 is applied to the access network device, the receiving unit included in the communication module 1602 of the communication apparatus is configured to perform a receiving operation on the access network device side, for example, receive a first bit sequence from a terminal device. The sending unit included in the communication module 1602 of the communication apparatus is configured to perform a sending operation on the access network device side, for example, send information to the terminal device. In addition, it should be noted that, if the apparatus is implemented by using a chip/chip circuit, the communication module may be an input/output circuit and/or a communication interface, and performs an input operation (corresponding to the foregoing receiving operation) and an output operation (corresponding to the foregoing sending operation). The processing module is an integrated processor, a microprocessor, or an integrated circuit.

The following describes in detail an implementation in which the communication apparatus 1600 is applied to the terminal device.

The communication apparatus 1600 includes:

- the processing module 1601, configured to determine a first decoder and a first bit sequence based on N decoders, where an input of the first decoder includes the first bit sequence, an output of the first decoder includes first channel information, and N is a positive integer; and
- the communication module 1602, configured to send information that indicates the first bit sequence.

In some embodiments, a difference between the first channel information and second channel information is less than a first threshold, and the second channel information is channel information obtained through measurement on the terminal device side.

In some embodiments, the N decoders may be first determined before the first decoder and the first bit sequence are determined based on the N decoders. When N equals 1, the one decoder may be determined as the first decoder. Then, the first bit sequence is determined based on the first decoder. When N is greater than 1, the first decoder may be one of the N decoders.

In some embodiments, the output of the first decoder in the N decoders is most approximate to the second channel information, where the second channel information is the channel information obtained through measurement on the terminal device side, and N is greater than 1.

In some embodiments, the processing module 1601 is further configured to determine an $(i+1)^{th}$ to-be-optimized bit sequence based on an $i^{th}$ to-be-optimized bit sequence, where i ranges from 1 to M−1, M is a positive integer greater than or equal to 2, and an Mt to-be-optimized bit sequence is the first bit sequence.

In some embodiments, the processing module 1601 is further configured to determine an $(i+1)^{th}$ to-be-optimized bit sequence based on an $i^{th}$ to-be-optimized bit sequence and a gradient descent algorithm, where i ranges from 1 to M−1, M is a positive integer greater than or equal to 2, and an $M^{th}$ to-be-optimized bit sequence is the first bit sequence.

In some embodiments, M is a preset value.

In some embodiments, an objective function of the gradient descent algorithm is used to indicate a difference between $i^{th}$ channel information and the second channel information, the second channel information is the channel information obtained through measurement on the terminal device side, the input of the first decoder includes the $i^{th}$ to-be-optimized bit sequence, and the output of the first decoder includes the $i^{th}$ channel information.

In some embodiments, the processing module 1601 is further configured to encode the second channel information based on an encoder corresponding to the first decoder, to determine a first to-be-optimized bit sequence, where the encoder is configured to encode channel information to obtain a bit sequence.

In some embodiments, the first to-be-optimized bit sequence is randomly determined.

In some embodiments, the communication module 1602 is further configured to send information that indicates the first decoder.

The following describes in detail an implementation in which the communication apparatus 1600 is applied to the access network device.

The communication apparatus 1600 includes:

- the communication module 1602, configured to obtain information that indicates a first bit sequence; and
- the processing module 1601, configured to obtain first channel information based on a first decoder and the first bit sequence, where an input of the first decoder includes the first bit sequence, and an output of the first decoder includes the first channel information.

In some embodiments, a difference between the first channel information and second channel information is less than a first threshold, and the second channel information is channel information obtained through measurement on the terminal device side.

In some embodiments, the communication module 1602 is further configured to obtain information that indicates the first decoder.

In some embodiments, the communication module 1602 is further configured to send information that indicates N decoders, where the N decoders include the first decoder, and N is a positive integer.

Module division in the present disclosure is an example, and is merely logical function division and may be other division in actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

Based on a same technical concept, this application further provides a communication apparatus 1700. The communication apparatus 1700 may be a chip or a chip system. Optionally, in the present disclosure, the chip system may include a chip, or may include a chip and another discrete device.

The communication apparatus 1700 may be configured to implement a function of the terminal device or the access network device in the communication system shown in FIG. 1. The communication apparatus 1700 may include at least one processor 1710. The processor 1710 is coupled to a memory. Optionally, the memory may be located in the apparatus, the memory may be integrated with the processor, or the memory may be located outside the apparatus. For example, the communication apparatus 1700 may further include at least one memory 1720. The memory 1720 stores a computer program, configuration information, or instructions and/or data necessary for implementing any one of the foregoing embodiments. The processor 1710 may execute the computer program stored in the memory 1720, to complete the method in any one of the foregoing embodiments.

The communication apparatus 1700 may further include a communication interface 1730, and the communication apparatus 1700 may exchange information with another device through the communication interface 1730. For example, the communication interface 1730 may be a transceiver, a circuit, a bus, a module, a pin, or a communication interface of another type. When the communication apparatus 1700 is a chip-type apparatus or circuit, the communication interface 1730 in the apparatus 1700 may alternatively be an input/output circuit, and may input information (or receive information) and output information (or send information). The processor is an integrated processor, a microprocessor, an integrated circuit, or a logic circuit. The processor may determine output information based on input information.

Couplings in the present disclosure are indirect couplings or communication connections between apparatuses, units, or modules, may be in an electrical form, a mechanical form, or another form, and are used for information exchange between the apparatuses, the units, and the modules. The processor 1710 may operate cooperatively with the memory 1720 and the communication interface 1730. A specific connection medium between the processor 1710, the memory 1720, and the communication interface 1730 is not limited in the present disclosure.

Figure 17:
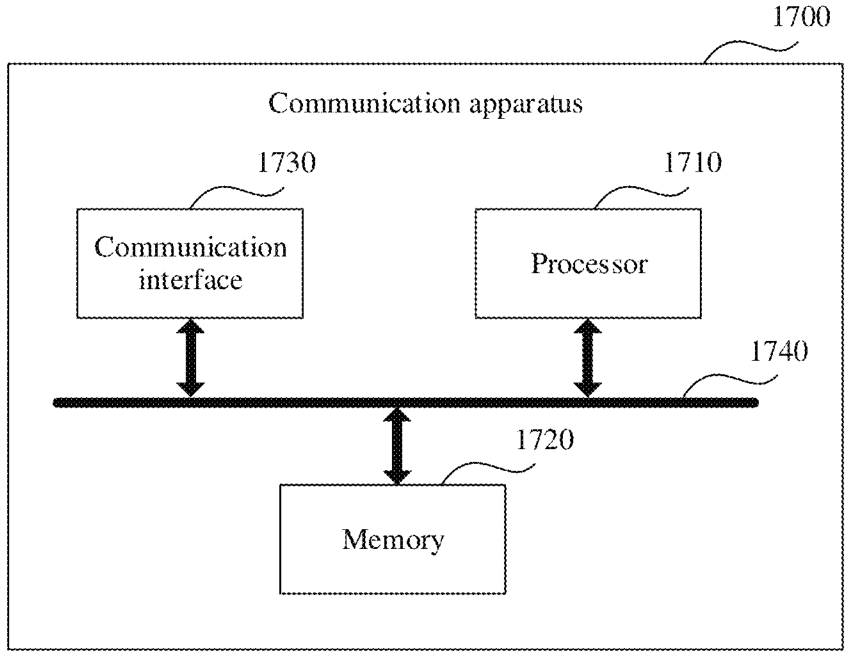
FIG. 17 is a schematic diagram of a structure of a communication apparatus according to the present disclosure.

Optionally, as shown in FIG. 17, the processor 1710, the memory 1720, and the communication interface 1730 are connected to each other through a bus 1740. The bus 1740 may be a peripheral component interconnect (peripheral component interconnect, PCI) bus, an extended industry standard architecture (extended industry standard architecture, EISA) bus, or the like. The bus may be classified into an address bus, a data bus, a control bus, or the like. For ease of representation, only one thick line is used to represent the bus in FIG. 17, but this does not mean that there is only one bus or only one type of bus.

In the present disclosure, the processor may be a general-purpose processor, a digital signal processor, an application-specific integrated circuit, a field programmable gate array or another programmable logic device, a discrete gate or a transistor logic device, or a discrete hardware component; and may implement or perform methods, steps, and logical block diagrams that are disclosed in the present disclosure. The general-purpose processor may be a microprocessor, any processor, or the like. The steps of the methods disclosed with reference to the present disclosure may be directly implemented by a hardware processor, or may be implemented by a combination of hardware and a software module in the processor.

In the present disclosure, the memory may be a non-volatile memory such as a hard disk (hard disk drive, HDD) or a solid-state drive (solid-state drive, SSD): or may be a volatile memory (volatile memory) such as a random access memory (random access memory, RAM). The memory is any other medium that can be configured to carry or store expected program code in a form of instructions or a data structure and that can be accessed by a computer, but is not limited thereto. The memory in the present disclosure may alternatively be a circuit or any other apparatus that can implement a storage function, and is configured to store program instructions and/or data.

In a possible implementation, the communication apparatus 1700 may be applied to a terminal device. Specifically, the communication apparatus 1700 may be the terminal device, or may be an apparatus that can support the terminal device in implementing a function of the terminal device in any one of the foregoing embodiments. The memory 1720 stores a computer program, or a computer program or instructions and/or data necessary for implementing a function of the terminal device in any one of the foregoing embodiments. The processor 1710 may execute the computer program stored in the memory 1720, to complete the method performed by the terminal device in any one of the foregoing embodiments. When the communication apparatus 1700 is applied to the terminal device, the communication interface in the communication apparatus 1700 may be configured to: interact with an access network device, and send information to the access network device or receive information from the access network device.

In another possible implementation, the communication apparatus 1700 may be applied to an access network device. Specifically, the communication apparatus 1700 may be the access network device, or may be an apparatus that can support the access network device in implementing a function of the access network device in any one of the foregoing embodiments. The memory 1720 stores a computer program, or a computer program or instructions and/or data necessary for implementing a function of the access network device in any one of the foregoing embodiments. The processor 1710 may execute the computer program stored in the memory 1720, to complete the method performed by the access network device in any one of the foregoing embodiments. When the communication apparatus 1700 is applied to the access network device, the communication interface in the communication apparatus 1700 may be configured to: interact with a terminal device, and send information to the terminal device or receive information from the terminal device.

The communication apparatus 1700 provided in this embodiment may be applied to the terminal device to complete the method performed by the terminal device, or may be applied to the access network device to complete the method performed by the access network device. Therefore, for technical effects that can be achieved by the communication apparatus, refer to the foregoing method embodiments. Details are not described herein.

Based on the foregoing embodiments, the present disclosure further provides a computer program. When the computer program is run on a computer, the computer is enabled to perform, from a perspective of a terminal device side or an access network device side, the communication methods provided in the embodiments shown in FIG. 7, FIG. 8, FIG. 10, FIG. 12, and FIG. 14.

Based on the foregoing embodiments, the present disclosure further provides a computer-readable storage medium. The computer-readable storage medium stores a computer program. When the computer program is executed by a computer, the computer is enabled to perform, from a perspective of a terminal device side or an access network device side, the communication methods provided in the embodiments shown in FIG. 7, FIG. 8, FIG. 10, FIG. 12, and FIG. 14. The storage medium may be any available medium that can be accessed by the computer. An example of the computer-readable storage medium may include but is not limited to: a RAM, a read-only memory (read-only memory, ROM), an electrically erasable programmable read-only memory (electrically erasable programmable read-only memory, EEPROM), a CD-ROM or another compact disc storage, a magnetic disk storage medium or another magnetic storage device, or any other medium that can be used to carry or store expected program code in a form of instructions or a data structure and that can be accessed by the computer.

Based on the foregoing embodiments, the present disclosure provides a communication system, including a terminal device and an access network device. The terminal device and the access network device may implement the communication methods provided in the embodiments shown in FIG. 7, FIG. 8, FIG. 10, FIG. 12, and FIG. 14.

Based on the foregoing embodiments, the present disclosure further provides a chip. The chip is configured to: read a computer program stored in a memory, and implement, from a perspective of a terminal device side or an access network device side, the communication methods provided in the embodiments shown in FIG. 7, FIG. 8, FIG. 10, FIG. 12, and FIG. 14.

Based on the foregoing embodiments, the present disclosure provides a chip system. The chip system includes a processor, configured to support a computer apparatus in implementing functions of the terminal device or the access network device in the embodiments shown in FIG. 7, FIG. 8, FIG. 10, FIG. 12, and FIG. 14. In some embodiments, the chip system further includes a memory. The memory is configured to store a program and data that are necessary for the computer apparatus. The chip system may include a chip, or may include a chip and another discrete device.

All or some of the technical solutions provided in embodiments of the present disclosure may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, all or some of the procedures or functions according to the present disclosure are generated. The computer may be a general-purpose computer, a dedicated computer, a computer network, an access network device, a terminal device, an AI network element, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any available medium accessible by the computer, or a data storage device such as a server or a data center, integrating one or more available media. The available medium may be a magnetic medium (for example, a floppy disk, a hard disk, or a magnetic tape), an optical medium (for example, a digital video disc (digital video disc, DVD)), a semiconductor medium, or the like.

In the present disclosure, when there is no logical conflict, embodiments may be mutually referenced. For example, methods and/or terms in the method embodiments may be mutually referenced. For example, functions and/or terms in the apparatus embodiments may be mutually referenced. For example, functions and/or terms between the apparatus embodiments and the method embodiments may be mutually referenced.

It is clearly that, a person skilled in the art can make various modifications and variations to this application without departing from the scope of this application. This application is intended to cover these modifications and variations to this application provided that they fall within the scope of protection defined by the claims of this application and their equivalent technologies.

The invention claimed is:

1. A communication method, performed by a first communication apparatus, comprising:

determining a first decoder and a first bit sequence based on N decoders, wherein an input of the first decoder comprises the first bit sequence, an output of the first decoder comprises first channel information, where N is a positive integer; and sending first information useable to indicate the first bit sequence, wherein a difference between the first channel information and second channel information is less than a first threshold, and the second channel information is obtained through measurement on a terminal device side.

2. The communication method according to claim 1, wherein the output of the first decoder in the N decoders estimates second channel information, where N is greater than 1.

3. The communication method according to claim 1, comprising:

determining an (i+1)th to-be-optimized bit sequence based on an $i^{th}$ to-be-optimized bit sequence and a gradient descent algorithm, where i ranges from 1 to M−1, M is a positive integer greater than or equal to 2, and an $M^{th}$ to-be-optimized bit sequence is the first bit sequence.

4. The communication method according to claim 3, wherein the positive integer M is a preset value.

5. The communication method according to claim 3, wherein an objective function of the gradient descent algorithm is useable to indicate a difference between $i^{th}$ channel information and second channel information, the second channel information is obtained through measurement on a terminal device side, the input of the first decoder comprises the $i^{th}$ to-be-optimized bit sequence, and the output of the first decoder comprises the $i^{th}$ channel information.

6. The communication method according to claim 3, further comprising:

encoding second channel information based on an encoder corresponding to the first decoder, thereby determining a first to-be-optimized bit sequence, wherein the encoder is configured to encode channel information thereby obtaining a bit sequence, wherein the second channel information is obtained through measurement on a terminal device side.

7. The communication method according to claim 6, wherein the first to-be-optimized bit sequence is randomly determined.

8. The communication method according to claim 1, further comprising:

sending second information useable to indicate the first decoder.

9. A communication method, performed by a second communication apparatus, comprising:

obtaining first information useable to indicate a first bit sequence; and obtaining first channel information based on a first decoder and the first bit sequence, wherein an input of the first decoder comprises the first bit sequence, and an output of the first decoder comprises the first channel information, wherein the first bit sequence is determined based on a difference less than a first threshold and the difference is between the first channel information and second channel information, and the second channel information is obtained through measurement on a terminal device side.

10. The communication method according to claim 9, wherein the communication method further comprises:

obtaining information that indicates the first decoder.

11. The communication method according to claim 9, further comprising:

sending second information useable to indicate N decoders, wherein the N decoders comprise the first decoder, where N is a positive integer.

12. A communication apparatus, comprising a processor coupled to a memory, wherein the memory is configured to store non-transitory instructions, and the processor is configured to execute the non-transitory instructions thereby causing the apparatus to perform operating comprising:

determining a first decoder and a first bit sequence based on N decoders, wherein an input of the first decoder comprises the first bit sequence, an output of the first decoder comprises first channel information, where N is a positive integer; and sending first information useable to indicate the first bit sequence, wherein a difference between the first channel information and second channel information is less than a first threshold, and the second channel information is obtained through measurement on a terminal device side.

13. A communication apparatus, comprising a processor coupled to a memory, wherein the memory is configured to store non-transitory instructions, and the processor is configured to execute the non-transitory instructions thereby causing the apparatus to perform operating comprising:

obtaining first information useable to indicate a first bit sequence; and obtaining first channel information based on a first decoder and the first bit sequence, wherein an input of the first decoder comprises the first bit sequence, and an output of the first decoder comprises the first channel information, wherein the first bit sequence is determined based on a difference less than a first threshold and the difference is between the first channel information and second channel information, and the second channel information is obtained through measurement on a terminal device side.

* * * * *